US012245991B2

(12) United States Patent
Kamping et al.

(10) Patent No.: US 12,245,991 B2
(45) Date of Patent: Mar. 11, 2025

(54) PARTITIONING COMPONENT FOR A FEEDING BOTTLE

(71) Applicant: KONINKLIJKE PHILIPS N.V., Eindhoven (NL)

(72) Inventors: Wiecher Ferdinand Kamping, Esch (NL); Narasimha Shastri, Eindhoven (NL); Luc Berntsen, Eindhoven (NL); Christoph Dobrusskin, Nuenen (NL); Daan Hendrik Gosenshuis, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 101 days.

(21) Appl. No.: 17/909,469

(22) PCT Filed: Mar. 10, 2021

(86) PCT No.: PCT/EP2021/055967
§ 371 (c)(1),
(2) Date: Sep. 6, 2022

(87) PCT Pub. No.: WO2021/180751
PCT Pub. Date: Sep. 16, 2021

(65) Prior Publication Data

US 2023/0115317 A1 Apr. 13, 2023

(30) Foreign Application Priority Data

Mar. 13, 2020 (EP) .................................... 20163037

(51) Int. Cl.
*A61J 9/04* (2006.01)
*A61J 11/00* (2006.01)
*A61J 11/04* (2006.01)

(52) U.S. Cl.
CPC ............ *A61J 9/04* (2013.01); *A61J 11/0015* (2013.01); *A61J 11/045* (2013.01)

(58) Field of Classification Search
CPC ......... A61J 9/04; A61J 11/0015; A61J 11/045
USPC ........................................................ 215/11.5
See application file for complete search history.

(56) References Cited

U.S. PATENT DOCUMENTS 3,211,315 A 10/1965 Griesinger
5,758,786 A 6/1998 John
(Continued)

FOREIGN PATENT DOCUMENTS

CN 104688542 A 6/2015
EP 2224893 B1 6/2014
(Continued)

OTHER PUBLICATIONS

International Search Report and Written Opinion Dated May 28, 2021 for International Application No. PCT/EP2021/055967 for Mar. 10, 2021.

*Primary Examiner* — Rafael A Ortiz
*Assistant Examiner* — Sanjidul Islam

(57) ABSTRACT

A partitioning component (210) for dividing a feeding bottle (110) into two sections: one (125) associated with a container (120) part of the bottle and one (115) associated with a teat part (110) of the bottle. The partition allows for at least partial retention of liquid in the teat part even when the bottle is tipped in a horizontal position, the more natural position for feeding a user such as a baby or toddler. To enable flow of fluid between the two sections, the partitioning component comprises a passageway arrangement (215) which comprises one or more openings (225) and the passageway arrangement configured to enable flow of both liquid and air across the partition in different directions. This allows liquid to pass in, and air to pass out, of the teat section
(Continued)

(115) during filling of the teat. To enable maximal retention of liquid inside the teat section when the bottle is tilted in the horizontal position, the openings of the passageway arrangement are all confined to a single region of the partitioning component which, in use, is arranged offset on one diametric side of the bottle volume or of the teat volume.

15 Claims, 12 Drawing Sheets

(56) References Cited

U.S. PATENT DOCUMENTS

| | | | | |
|---|---|---|---|---|
| 7,798,347 | B2 * | 9/2010 | Rees | A61J 9/04<br>220/360 |
| 9,161,886 | B2 * | 10/2015 | Haberman | A61J 9/00 |
| 2012/0175335 | A1 | 7/2012 | Itzek | |
| 2012/0248056 | A1 | 10/2012 | Fischer | |
| 2014/0374372 | A1 | 12/2014 | Itzek | |

FOREIGN PATENT DOCUMENTS

| | | | | |
|---|---|---|---|---|
| EP | 3372218 | A1 * | 9/2018 | A61J 11/002 |
| EP | 3372219 | A1 | 9/2018 | |
| EP | 3598664 | A1 | 1/2020 | |
| EP | 3598964 | A1 | 1/2020 | |
| EP | 3677239 | A1 | 7/2020 | |
| WO | 00/03675 | A1 | 1/2000 | |
| WO | 2018/162366 | A1 | 9/2018 | |
| WO | 2018/162639 | A1 | 9/2018 | |
| WO | 2020020729 | A1 | 1/2020 | |

* cited by examiner

PARTITIONING COMPONENT FOR A FEEDING BOTTLE

CROSS REFERENCE TO RELATED APPLICATIONS

This application is the U.S. National Phase application under 35 U.S.C. § 371 of International Application No. PCT/EP2021/055967 filed Mar. 10, 2021, which claims the benefit of European Patent Application Number 20163037.3 filed Mar. 13, 2020. These applications are hereby incorporated by reference herein.

FIELD OF THE INVENTION

The present application relates to a partitioning component for a feeding bottle device, in particular a component for mediating flow of liquid and water between a teat part of the bottle and a container part of the bottle.

BACKGROUND OF THE INVENTION

Colic is a condition some infants suffer from during early months after birth, wherein presence of air in the digestive system is indicated as a major cause. Air ingestion is unavoidable both in breast-feeding and bottle-feeding due to the presence of vacuum in the infant's mouth during feeding. However, it is desired to reduce the amount of air ingested by the infant in order to prevent or alleviate colic-like symptoms.

Different strategies are used to minimize air ingestion during feeding, including reducing the effort required by the infant, for instance by reducing the vacuum through providing a venting valve in the bottle. However, air can nevertheless enter into a teat region of the feeding bottle device in case the liquid level within the feeding bottle drops below a certain level and/or the feeding bottle is provided to the infant in a horizontal position, i.e. a volume around the teat region will then only partially be filled by liquid. However, a horizontal or near-horizontal feeding position is preferred since it more closely mimics the natural feeding position.

EP 3598664 A1 suggests provision of a partitioning component between the teat and the bottle container which includes two fluid passageways on diametrically opposite sides: a first passageway allows passage of air or liquid, the second allows passage of only liquid. The first is designed to be below the level of the liquid when the bottle is in a horizontal drinking position in use. The second is designed to be above the level of the liquid when in a horizontal drinking position. By providing two such passageways, liquid can pass into the teat and air can pass out of the teat simultaneously during filling of the teat (by holding the bottle upside down, with the teat facing downward). However, because the second passageway is provided above the level of the fluid and unable to pass air, this means that when the bottle is then in the horizontal position, air is unable to enter the teat.

However, with this arrangement, air can still be left present at the top of the teat volume during drinking, particularly as the fluid level drops. Due to the second opening which allows passage of fluid only, fluid preset in the teat volume which is above the general fluid level in the container volume will leak out through this opening, leaving air at the top of the teat volume.

Thus, an improved approach to preventing air ingestion during feeding is still required.

SUMMARY OF THE INVENTION

The invention is defined by the claims.

According to examples in accordance with one aspect of the invention, there is provided a partitioning component for a feeding bottle, the feeding bottle comprising a teat component, and a container component, which together define a bottle volume extending longitudinally between a base end of the container component, and a top end of the teat component, the bottle volume having a longitudinal axis extending from said base end to said top end, and a diametric dimension extending orthogonal to the longitudinal axis, the partitioning component for fluidly dividing the bottle volume into two longitudinal sections, a teat section extending from the top end of the bottle to the partitioning component, and a container section extending from the partitioning component toward the base of the bottle, and the partitioning component comprising a fluid passageway arrangement comprising one or more openings for permitting flow of fluid across the partitioning component;

wherein the passageway arrangement is arranged such that when the partitioning component is in place in the bottle for dividing the bottle volume, the passageway arrangement is located on one diametric side of the bottle volume or the teat section of the bottle volume, and wherein the remainder of the partitioning component does not permit passage of fluid in either direction between the container component and teat component (for example it is impermeable to such fluid passage), the passageway arrangement configured to permit flow of both liquid and air in different directions across the partitioning component.

One aspect of the invention provides the partitioning component alone. Another aspect of the invention provides a feeding bottle comprising the partitioning component. The partitioning component may be adapted to be removably positioned within the bottle volume.

The passageway arrangement may be configured to provide simultaneous flow of both liquid and air in different respective directions across the partitioning component.

Preferably, the passageway arrangement is located on one diametric side of the bottle volume or the teat section of the bottle volume, and the remainder of the partitioning component provides no fluid communication between the container component and the teat component.

The passageway arrangement may be arranged such that, when the partitioning component is in place in the bottle for dividing the bottle volume, the one or more openings of the passageway arrangement extend to multiple heights along the direction of the longitudinal axis of the bottle volume.

In accordance with one or more embodiments, the partitioning component may have an outer boundary, and wherein the passageway arrangement is arranged such that the one or more openings of the passageway arrangement extend, either alone or in combination, to multiple heights along a dimension normal to a plane defined by or containing the outer boundary of the partitioning component. The outer boundary may mean a boundary of at least a portion of the partitioning component which is arranged for fluidly dividing the bottle volume into the two longitudinal sections. The outer boundary may mean a boundary of at least a portion of the partitioning component which is arranged to be located within the bottle volume during use. The outer boundary may mean a boundary which is designed to engage with interior side faces or surfaces of the bottle, or side walls of the bottle.

In some embodiments, the one or more openings of the passageway arrangement may be arranged such that, when the partitioning component is in place in the bottle for dividing the bottle volume, the one or more openings of the passageway arrangement extend, either alone or in combination, to multiple heights along the direction of the longitudinal axis of the bottle volume. The different heights may be different heights both along said longitudinal axis and along said axis normal to a plane of the partitioning component. Alternatively, the openings may be through-holes which are flat relative to said plane of the partitioning component (e.g. the partitioning component is a flat disc with openings formed through it), but wherein the partitioning component is arranged to be installed in a slanted configuration within the bottle volume so that the one or more openings, together or in combination, include portions disposed at different heights along the bottle longitudinal axis. In other words, the partitioning component is arranged to be installed in the bottle in use so that the plane containing its boundary is at a non-zero (oblique) angle with respect to a plane which is perpendicular to the bottle longitudinal axis.

For example, the one or more openings of the passageway arrangement may each comprise a boundary, and wherein the boundaries of the one or more openings extend, either alone or in combination, to the multiple heights. This means that the boundaries of the one or more openings include at least points or sections which are positioned, either alone, or in combination, at multiple heights along said axis normal to the plane of the partitioning component and/or along the bottle longitudinal axis (when the partitioning component is in place in the bottle for dividing the bottle volume).

In the present context 'extend to' means for example that a boundary of the opening includes at least a section or point which is located at the relevant height.

Thus embodiments of the present invention are based on providing a passageway arrangement which permits bi-directional flow of liquid and air, and wherein the passageway arrangement is offset on one diametric side of the bottle volume.

Preferably the partitioning component is configured so that the passageway arrangement is located offset on one diametric side of the teat section of the bottle volume.

More broadly, all of the openings of the partitioning component are, according to embodiments of this invention, located on the same single (diametric) side of the bottle volume (or teat section of the volume), and with the partitioning component configured so that when installed in the bottle, no fluid passageways are present on the other side. Apart from the single passageway arrangement the rest of the partitioning component is fluid blocking with respect to passage of fluid from the teat section to the container section.

The bottle volume may have a central longitudinal axis, and wherein the passageway arrangement is arranged so as to be offset from this central longitudinal axis of the volume.

The teat section may have a central longitudinal axis, and wherein the passageway arrangement is arranged so as to be offset from this central longitudinal axis of the teat section of the volume, on one diametric side of the teat volume.

By diametric side of the bottle volume or teat section volume may be meant one half of the bottle or teat section volume, having a cross-section which covers one half of a diametric cross-section of the volume (a cross-section cutting perpendicular the longitudinal axis mentioned above).

This can be facilitated according to one set of embodiments by providing the passageway arrangement located on one diametric side of the partitioning component (and for example offset from a center of the partitioning component), and wherein the remainder of the partitioning component is fluid impermeable. One diametric side means for example one half of a face of the partitioning component. This means that at least one whole side of the partitioning component is fluid blocking, while at the same time, flow of both air and liquid across the partition is enabled by the single passageway arrangement.

It might in some cases for example be at or towards a side edge of the partitioning component, and confined to only a narrow circumferential region around said side edge.

This may be the case for example in embodiments in which the partitioning component is a disk or membrane element arranged to fully traverse or span the cross-section of the bottle volume, from one side to the other.

However, in other embodiments, the partitioning component may be formed of multiple parts or may be asymmetric in shape, or the bottle volume may comprise an offset, narrowed-width section within which the partitioning component is located, meaning that the offset passageway arrangement may not be offset with respect to a center of the partitioning component itself.

In any of these cases, this arrangement is advantageous since it means that, after the teat section has been filled with liquid, for example by tipping the assembled bottle upside down, with the teat facing downward, the liquid can be substantially retained in the teat section behind the partition without leaking out, even when the bottle is in the horizontal feeding position. In particular, the absence of holes on at least one diametric side of the bottle volume (particularly the teat section of the bottle volume) means that liquid cannot leak out from the teat volume via this side. In use, the part with the passageway arrangement can be oriented downward, so that the openings are at the lowest point gravitationally, and with the remainder of the partition radially above these openings being fluid impermeable. This means that liquid can only escape through the openings near the bottom. Since this region will typically remain below the level of the liquid in the container volume, even as the liquid level declines, this means that the teat can be maintained filled with liquid even in a horizontal position, thus avoiding leaking of air into the teat section.

Thus, the fluid impermeable part of the partition permits retention of a volume of liquid in the teat section. This allows for the teat volume to remain filled with liquid even with the bottle in a horizontal feeding position.

By way of example, the partitioning component may comprise a membrane or disk extending radially across the bottle volume spanning across the bottle cross-section between the inner surfaces of the walls of bottle.

By way of example, the partitioning component may be round or annular in its outer boundary shape, e.g. circle, oval, elliptical in shape. It has an outer boundary or perimeter which encircles the component for example.

The partitioning component may have a diametric or radial dimension associated with it. It may have a uniform diameter or radius (e.g. in the case of a circular component), or the radius or diameter may vary in length.

The partitioning component may be configured to be arranged in the bottle with the diametric dimension extending obliquely to the bottle longitudinal axis, for example extending perpendicularly to the longitudinal axis.

A single diametric side means a region lying on one side of a diametric mid-line of the component (or the bottle or teat volume). In other words, a region extending from one edge of the partitioning component radially or diametrically inward to a mid-way point across the component or volume, i.e. a distance equal to one half of the diameter of the component or volume cross-section. In the case of a circular shaped component for example, this is effectively one 'hemisphere' of the component.

In some examples, the partitioning component can be formed of multiple parts which may be joined or may be separated. It may be radially asymmetric. Examples will be described in further detail in the next section.

Preferably the container section of the volume is fluidly continuous across a radial dimension of the container, i.e. it is undivided from one diametric side of the bottle to the other. This allows for the passageway arrangement on the one single side to effectively function in filling the teat and for the partitioning component to function in retaining the liquid in the teat.

The partitioning component is preferably arranged such that the single passageway arrangement provides the only fluid communication between the teat section of the volume and the container section of the volume.

Preferably the passageway arrangement is configured to permit simultaneous flow of liquid and air in opposite directions across the partitioning component.

Preferably the openings of the passageway arrangement are sized and shaped so as to permit said simultaneous flow.

In one set of embodiments, the passageway arrangement may include at least one opening having a diameter of at least 10 mm.

The passageway arrangement may be sized and shaped to provide two simultaneous fluid flow-paths, separated spatially, to permit said flow of both liquid and air.

The two fluid flowpaths can be provided by a single opening or by two separate openings. Then flowpaths are spaced from one another spatially, allowing independent simultaneous passage of fluid and air.

In advantageous embodiments, the passageway arrangement may be positioned so that a shortest distance from the passageway arrangement to an outer boundary of the partitioning component is less than one quarter of a diameter of the partitioning component, and preferably less than one fifth of the diameter, and more preferably less than one sixth of the diameter.

The passageway arrangement may be confined to a segment of the partitioning component having a segment sagitta of less than one quarter of a diameter of the partitioning component, and preferably less than one fifth of the diameter, and more preferably less than one sixth of the diameter.

In some embodiments, the passageway arrangement may be confined to a region of the partitioning component extending across less than one quarter of the total perimeter of the partitioning component, and preferably less than one fifth of the perimeter and more preferably less than one sixth of the perimeter.

For example, the partitioning component may have a circumference, and the region containing the partitioning component may define a segment of the partitioning component, and wherein an arc length of the segment is less than one quarter of the total circumference of the partitioning component, and preferably less than one fifth of the circumference and more preferably less than one sixth of the circumference.

In one or more embodiments, the passageway arrangement may be located closer to an outer boundary of the component than to the center of the component. By confining the passageway arrangement close to a boundary of the partitioning component, this maximizes the diametric length of the portion of the component which is fluid blocking.

This therefore maximizes the liquid retention capability of the partitioning component within the teat section when the bottle is in use in the horizontal feeding position. The holes are all as close as possible to a lower edge of the component, meaning that liquid cannot escape out from the partition above this level.

Preferably the openings of the passageway arrangement are through-holes in the partitioning component, e.g. preferably not valves.

Preferably the one or more openings of the passageway arrangement are all substantially the same size. Same size means for example the same cross-sectional area and/or same diameter.

According to one set of embodiments, the passageway arrangement may comprise a single opening only.

The opening is sized and shaped to provide two simultaneous fluid pathways across the barrier, spatially separated from one another.

By way of non-limiting example, it has been found in one set of experiments by the inventors that a single opening of diameter greater than 10 mm is sufficient for two flow paths to be reliably provided across the opening. More preferably, the single opening may be provided with diameter greater than 12 mm, for example greater than 14 mm. These represent one example range of dimensions which may be advantageous in accordance with one or more embodiments. However, opening sizes smaller than those set out above may also be functional, and the optimal size for the opening may depend upon the size of the bottle volume (and hence the likely liquid pressure through the holes) and also the materials of the partitioning component. Thus the above example dimensions are not limiting for the inventive concept.

In one or more embodiments, the passageway arrangement may consist of a single elongate opening, where this is preferably an elongate through-hole.

Preferably, the elongate length of this opening extends transverse, e.g. substantially or approximately perpendicular, a radial dimension or axis of the partitioning component, i.e. extends tangentially across the partitioning component.

Elongate has its usual meaning, indicating that the opening is longer (in an elongate dimension) than it is wide.

The partitioning component may consist of a single opening, and wherein this opening is formed by a cut-out portion of the partitioning component, cut out from an edge of the partitioning component.

According to one set of embodiments, the passageway arrangement may be arranged to provide passageways at multiple heights (for example along the longitudinal axis of the bottle volume). The partitioning component may have an outer boundary which defines a plane (lies in a plane), and wherein the multiple heights are multiple heights along an axis normal to this plane of the partitioning component.

By way of example, the passageway arrangement may be arranged to provide one or more openings being raised relative to one or both faces of the partitioning component. By this is meant that the passageway arrangement comprises one or more openings, the boundary of at least one of which includes at least a section which is raised relative to a plane of the partitioning component, the plane being defined as outlined above.

There may be a single passageway which covers multiple heights, and/or there may be multiple passageways which extend to different respective heights.

Height in this case may for example mean a dimension normal to a plane defined by (or containing) an outer boundary of the partitioning component. Additionally or alternatively, height may mean a dimension along a longitudinal axis of the bottle.

In one or more examples, a boundary of at least one of the openings may have a split height, wherein one side of the opening is at a first height along the direction of the bottle longitudinal axis, and the other side is at a second, greater height.

The surface of the partitioning component may be arranged to slope or curve upwards to meet said higher side, or there may be a step change in the height for example.

In one or more examples, the passageway arrangement may include a plurality of openings, wherein a boundary of one of the openings is arranged to be at a first height along the longitudinal axis, and at least a second is arranged to be at a second, greater height.

According to one or more embodiments, the surface of the partitioning component may be arranged to slope or curve downward (or upward) away from all sides of at least one of the one or more openings, for guiding fluid through the at least one of the one or more openings. It defines a funnel shape for example.

In accordance with one or more embodiments, the bottle may comprise a further fluid passage arranged to provide fluid communication between an outside of the bottle and the container section of the bottle volume. This allows air to enter the container section as liquid is drawn from the bottle through the teat.

The further fluid passage may for example comprise an inlet (e.g. valve) in the teat component fluidly connected to an outside of the bottle, and further fluidly connected (e.g. via a connection conduit) to the container section (for example by-passing the teat section). In one set of embodiments for instance, the inlet may be fluidly connected to the container section via a passageway that runs at least in part through the body of the partitioning component. For example the partitioning component may comprise a fluid inlet arranged to fluidly couple with the fluid inlet or valve in the teat section when the bottle is assembled, and to channel air from this inlet through a conduit running through at least a part of the partitioning component body, and then out through an outlet fluidly coupled with the container section of the volume when the bottle is assembled. This outlet is preferably arranged on a diametrically opposite side of the partitioning component to the passageway arrangement. The fluid conduit does not provide fluid communication between the container volume and the teat volume, but by-passes this teat volume. Thus the single passageway arrangement remains the only fluid communication provided by the partitioning component between the teat section and the container section.

Alternatively an air inlet (e.g. valve) may be provided in the container section providing fluid connection between the outside of the bottle and the container section to permit entry of air as fluid leaves the container component.

Examples in accordance with a further aspect of the invention provide a feeding bottle comprising:

a teat component, and a container component, the components being attachable to form an enclosed bottle volume therein, the bottle volume extending longitudinally between a base end of the container component, and a top end of the teat component; and a partitioning component in accordance with any example or embodiment outlined above or described below, or in accordance with any claim of this application, arranged to fluidly divide the bottle volume into said two longitudinal sections.

The passageway arrangement may be arranged such that, when the partitioning component is in place in the bottle for dividing the bottle volume, the one or more openings of the passageway arrangement extend, either alone or in combination, to multiple heights along the direction of the longitudinal axis of the bottle volume.

The passageway arrangement may comprise a single passageway which alone extends to multiple heights, and/or may comprise multiple passageways which extend to different respective heights.

For example, the one or more openings of the passageway arrangement may each comprise a boundary, and wherein the boundaries of the one or more openings extend, either alone or in combination, to multiple heights. This means that the boundaries of the one or more openings include at least points or sections which are positioned, either alone, or in combination, at multiple heights along the bottle longitudinal axis (when the partitioning component is in place in the bottle for dividing the bottle volume).

In the present context ‘extend to’ means that a boundary of the opening includes at least a section or point which is located at the relevant height (when the partitioning component is installed in the bottle volume).

Thus, the passageway arrangement may include openings which each have a boundary, and wherein the boundaries of a single opening alone, or the boundaries of a plurality of openings together are positioned at multiple heights along the longitudinal axis when the partitioning component is installed within the bottle volume.

According to one more embodiments, the partitioning component may be formed integrally with either the teat component or the container component. Alternatively, the partitioning component may be removably insertable within the bottle.

In some examples, the feeding bottle may include attachment or retaining means (such as screw or threading means) by which the partitioning component is retained in position in the bottle. The retaining means may simply comprise a lip or flange or set of flaps comprised by the partitioning component which permit seating of the partitioning component on a top of a rim of a neck of the container component. The partitioning component may in further examples be adapted to be frictionally retained in place in the bottle volume.

In one or more embodiments, a boundary of at least one of the one or more openings of the passageway arrangement has (or covers) multiple heights, wherein at least one section of the opening boundary is at a first height along the direction of the bottle longitudinal axis, and at least another section of the opening boundary is at a second, greater height. For example, a boundary of at least one of the one or more openings of the passageway arrangement may have a split height, wherein one side of the opening is at a first height along the direction of the bottle longitudinal axis, and the other side is at a second, greater height.

Additionally or alternatively, the passageway arrangement may include a plurality of openings, wherein a boundary of one of the openings is arranged to be at a first height along the direction of the longitudinal axis, and at least a second is arranged to be at a second, greater height.

In one or more embodiments, the partitioning component may have an outer boundary, and wherein the multiple heights are multiple heights along a dimension normal to a plane defined by or containing the outer boundary of the partitioning component. In this example, the openings are raised relative to a plane of the partitioning component, i.e. the multiple heights are heights out-of-plane of the partitioning component.

The surface of the partitioning component may be arranged to slope or curve upwards to meet said higher sections of the one or more opening boundaries, or alternatively there may be a step change in the height.

According to one or more embodiments, the surface of the partitioning component may be arranged to slope or curve downward (or upward) away from all sides of at least one of the one or more openings.

The container component may be tubular.

In accordance with one or more embodiments, the teat component may comprise a teat outlet for drinking fluid from the bottle, and wherein the teat outlet comprises a drinking valve. The valve regulates fluid flow to prevent flow of air into the teat component through the teat outlet. The valve may be a one-way valve for example which allows liquid to be drawn out from inside the teat volume to outside the bottle, but does not permit fluid flow into the teat component from outside.

In accordance with one or more embodiments, the partitioning component may comprise a membrane or disc element. The membrane or disc element may be for spanning a cross-section of the bottle volume when the partitioning component is in position.

The membrane or disc element may be formed of an elastomeric material such as silicone.

The membrane or disc element may comprise an elastic material, and wherein the disk element is adapted in use to be elastically retained in position in the bottle by means of the elasticity of the material. It may be retained in place by elastic or friction fit for example.

In some examples, the partitioning component is configured to be positioned at an interface or boundary between the teat component and the container component.

A further aspect of the invention provides a partitioning component for a feeding bottle, the feeding bottle comprising a teat component, and a container component, which together define a bottle volume extending longitudinally between a base end of the container component, and a top end of the teat component, the bottle volume having a longitudinal axis extending from said base end to said top end, and a diametric dimension extending orthogonal to the longitudinal axis, the partitioning component for fluidly dividing the bottle volume into two longitudinal sections, a teat section extending from the top end of the bottle to the partitioning component, and a container section extending from the partitioning component toward the base of the bottle, and the partitioning component comprising a fluid passageway arrangement comprising one or more openings for permitting flow of fluid across the partitioning component;

wherein the passageway arrangement is arranged such that when the partitioning component is in place in the bottle for dividing the bottle volume, said passageway arrangement is located on one diametric side of the bottle volume, or the teat section of the bottle volume, and wherein the remainder of the partitioning component provides no fluid communication between the container component and the teat component, the passageway arrangement configured to permit simultaneous flow of both liquid and air in different respective directions across the partitioning component, wherein the passageway arrangement includes at least one opening having a diameter of at least 10 mm.

A further aspect of the invention provides a partitioning component for a feeding bottle, the feeding bottle comprising a teat component, and a container component, which together define a bottle volume extending longitudinally between a base end of the container component, and a top end of the teat component, the bottle volume having a longitudinal axis extending from said base end to said top end, and a diametric dimension extending orthogonal to the longitudinal axis, the partitioning component for fluidly dividing the bottle volume into two longitudinal sections, a teat section extending from the top end of the bottle to the partitioning component, and a container section extending from the partitioning component toward the base of the bottle, and the partitioning component comprising a fluid passageway arrangement comprising one or more openings for permitting flow of fluid across the partitioning component;

wherein the bottle volume has a cross-section perpendicular the longitudinal axis of the bottle and parallel to a diameter of the bottle volume, and wherein the passageway arrangement is arranged such that when the partitioning component is in place in the bottle for dividing the bottle volume, said passageway arrangement is confined to an area of the bottle volume, or the teat volume, extending across the bottle volume or teat volume cross-section a distance no greater than one third of the diameter, with a remainder of the bottle volume cross-section providing no fluid communication between the container component and the teat component.

The passageway arrangement is configured to permit simultaneous flow of both liquid and air in different respective directions across the partitioning component.

The passageway arrangement need not be located within a single plane extending parallel with the bottle or teat volume diametric cross-section. In other words, it is the projection of the passageway arrangement onto the diametric cross-section of the bottle volume or teat volume that should, in this set of embodiments, be confined to a region extending across the cross-section by a distance no greater than one third of the diameter.

The passageway arrangement may be confined to a segment of the bottle volume diametric cross-section, or the teat volume diametric cross-section, having a segment sagitta of no greater than one third of a diameter of the bottle volume or teat section volume.

In particular examples, the passageway arrangement may be confined to a segment of the partitioning component, having a segment sagitta of no greater than one third of a diameter of the partitioning component.

The maximum width of the bottle volume cross-section may define the diameter of the bottle volume.

Below are described further aspects of the invention. Features described in relation to these further aspects may also be applied or combined into any of the partitioning component embodiments described above or below, or as set out in any claim of this application.

According to a further aspect of the invention, there is provided an arrangement for a feeding bottle, the feeding bottle comprising a teat component, and a container component, which together define an internal bottle volume extending longitudinally between a base end of the container component, and a top end of the teat component, the arrangement comprising an internal element for positioning inside the bottle volume, and a protruding element arranged for extending from the internal element to an outside of the bottle when the bottle is in an assembled state, with the internal element in position, for providing an interconnection between inside and outside of the bottle.

The bottle volume may have a longitudinal axis extending from said base end to said top end, and a diametric dimension extending orthogonal to the longitudinal axis.

The feeding bottle comprises a coupling arrangement for coupling the teat component to the container component, and wherein the protruding element is arranged to extend to an outside of the bottle via or along the coupling arrangement.

The internal element is for locating at a position inside the bottle, either inside the container component or inside the teat component. It may be securable in a fixed position e.g. via an integral coupling or retaining means comprised by the internal element.

The bottle volume is defined at least in part by respective internal cavities of the teat component and container component.

The arrangement provides an interconnection between the bottle volume inside the bottle, and the outside of the bottle.

The internal element is preferably configured to be positioned in the bottle such that it is exposed to (i.e. it is arranged to come into contact with) and/or has access to the bottle volume, i.e. the contents of the bottle volume. Preferably, it is exposed to (i.e. it is arranged to come into contact with) and/or has fluid, mechanical, electrical or data communication access to both the teat section of the volume and the container section of the volume. This way interconnection is facilitated between the outside of the bottle and both the teat and container sections of volume.

Here, reference to the teat section and container sections of the volume can be understood as follows. A teat section of the volume may extend from the top end of the bottle to the internal element, and a container section may extending from the internal element toward the base of the bottle. Alternatively a teat section may be understood as the part of the bottle volume formed by an internal cavity of the teat component, and the container section the part of the bottle volume formed by an internal cavity of the container component.

The internal element may be an integral component of either the container component or the teat component in some examples, or may be a separate component which can be fixed in place in the bottle in use. The internal element may effectively provide an internal anchoring element for holding the protruding element in in place.

The internal element and protruding element may be integral parts of a single unitary component, formed of a single unitary body in some examples.

The protruding element protrudes from the internal element, and extends to an outside of the bottle, by which is meant outside of the bottle volume, by which is meant outside of the internal cavity defined by the container and teat component. It preferably has an external portion which is accessible to touch by a user for example.

The purpose of the arrangement is to provide a general means for facilitating a connection or interface between the inside of the bottle and the outside of the bottle that does not require passing through a boundary wall of bottle. Instead, the protruding element follows a path which takes it out of the bottle via the coupling which joins at least two components of the bottle together. The protruding element thus effectively provides an interconnect element between the internal element and an outside of the bottle.

The arrangement can be for different functions according to different embodiments. In one set of embodiments for example, the protruding element provides an external indicator for indicating an orientation of the internal component. It provides a visual indicator because it includes an external portion which is visible to a user from the outside. It also provides a tactile indicator, because it comprises a physical member which can be felt, thus enabling orientation to be determined even in the dark. In other embodiments, it may be for providing an electrical and/or data connection between the inside of the bottle and the outside, for example for powering a heating element, or receiving data from a sensor such as a temperature sensor.

The protruding element may extend through the coupling arrangement. For example, it may extend between interfacing parts or surfaces of the coupling arrangement. For example, it may extend via a passageway or space defined through or along the coupling arrangement, for example between interfacing components or parts of the coupling arrangement. For example the coupling arrangement comprises two co-operating coupling faces which engage to provide the coupling, and wherein the protruding element extends through a passageway or space defined in-between these coupling faces (bounded on either side by the coupling faces).

The protruding element may have a hook or flap shape for permitting the member to extend over and around the top of an upper edge of the container component, to permit passage of the protruding element to the outside of the container component. In some examples, the hook shape may extend flat over the upper edge of the container component and then down at least part of an outer wall of the container component, in a direction along the longitudinal axis of the bottle.

The internal element may be for providing a support function, for holding the protruding element in a fixed position relative to the container component and teat component. For example, the internal element may comprise an attachment or retaining means for retaining the internal element at a fixed position within the volume of the bottle. This may be integral to the internal element. For example, the internal element may comprise a protrusion adjacent an outer edge arranged to facilitate friction fit of the element between internal walls of the bottle. The internal element may be formed of an elastic or resilient material, and wherein the element is adapted to be retained elastically in position in the bottle. In another example, the internal element may comprise one or more flange elements arranged to protrude from an outer boundary of the element for hooking over a top edge of a container component of the bottle.

The protruding element may comprise an external part arranged to be exposed at an outside of the bottle.

The protruding element may comprise an external physical indicator element for providing a visual and/or tactile indication of an orientation of the internal component relative to the bottle. The protruding element has a fixed position relative the internal element, which means that changes in the orientation of the internal element (inside the bottle) are directly coupled to changes in a position of the protruding element at the outside of the bottle (e.g. the indicator element). For example the angular position of the protruding element around the bottle changes.

In some embodiments, the internal element may carry or be coupled to a further functional element also for location in the bottle volume when assembled, and wherein the protruding element has a fixed position relative to the further functional element, such that an external portion of the protruding element may provide a visual and/or tactile indication of the position (e.g. orientation) of the functional element inside the bottle. By way of example, the further functional element might be any one or more of: a passageway arrangement formed in the internal element for permitting passage of fluid across the element; a valve, an air guiding member, a sensor, or even an electrical component such as a heater or mixer.

An internal functional element such as these may not be visible from outside the bottle when the bottle is assembled. Hence the protruding element provides a link to this internal functional element allowing its orientation in the bottle to be determined quickly from outside. This can be useful where the functional element is a fluid interaction element such a fluid guiding element or a valve or a passageway or a heater or mixer, since the element can be rotated to a position where it will be at a correct position with respect to the liquid inside the bottle, e.g. so as to be in contact with the liquid or avoiding contact with the liquid. For example the bottle can be held in a horizontally tilted position so that the liquid is gravitationally collected on one side of the bottle, and the functional element can be rotated to be exposed to or not be exposed to the liquid.

The internal element may take the form of a disc or ring element shaped for traversing a cross-section of the bottle volume. It extends transverse the longitudinal axis of the bottle volume. For example it may span the cross-section of the bottle volume. The cross-section means the diametric cross-section, i.e. across a plane perpendicular or transverse the longitudinal axis.

The disc element may comprise a continuous planar disc element; or the disc element may comprises an annular disk element. In other examples, it may comprise a ring element which may or may not be in the form of a disc, e.g. an elastomeric ring.

The disc or ring element may be configured to be positioned at an interface or junction between the container component and the teat component of the bottle.

The protruding element may be adapted to provide a communication function between the inside and the outside of the bottle.

For example, the protruding element may be adapted to provide one or more of: data communication, electrical communication, fluid communication, and optical communication.

For example, in some embodiments, the protruding element may incorporate an electrically conducting element for providing an electrical interconnection between the inside and outside of the bottle.

Additionally or alternatively, in some examples, the protruding element may comprise a data-carrying line for providing a data interconnection between an inside and outside of the bottle.

In some embodiments, the protruding element may be configured to provide a mechanical interface between the inside and outside of the bottle.

For example, the protruding element may comprise a mechanical connector for providing a mechanical interface between the inside and outside of the bottle. This may be for coupling a mechanical action from outside the bottle to inside the bottle. For example, the connector may be adapted for physically connecting in use to an element inside the bottle to couple a mechanical action from outside of the bottle to inside the bottle (the bottle volume).

The internal element may in some embodiments be a partitioning component for fluidly dividing the bottle volume into two longitudinal sections, a teat section extending from the top end of the bottle to the partitioning component, and a container section extending from the partitioning component toward the base of the bottle.

The partitioning component may comprise a fluid passageway arrangement comprising one or more openings for permitting flow of fluid across the internal element.

The protruding element in this case may be for providing a visual and/or tactile indication of an orientation of the internal element. For example the protruding element may comprise a physical indicator element for providing a visual and/or tactile indication of the orientation.

For example it may be for providing an indication of an orientation of the passageway arrangement. This enables a user to know at which axial orientation the bottle should be held in order for the liquid to be retained in the teat by the partitioning component when the user drinks with the bottle in the horizontal drinking position.

Additionally or alternatively, the protruding element may be configured to provide a tactile indication of an orientation of the internal element relative to the bottle. For example, the external part of the protruding element may comprise an end cap or end piece at a terminal end of the protruding element which is arranged to be accessible to touch by a user for providing a tactile indicator.

Examples according to a further set of embodiments provide a feeding bottle comprising a teat component, and a container component, the components together forming an internal bottle volume, the bottle volume extending longitudinally between a base end of the container component, and a top end of the teat component; and an arrangement for a feeding bottle in accordance with any example or embodiment outlined above or described below, or in accordance with any claim of this application.

The internal element may comprise a disc element shaped for traversing a cross-section of the bottle volume, wherein the disc element is configured to be positioned at an interface or junction between the container component and the teat component of the bottle.

The feeding bottle may further include a coupling interface or arrangement between the teat component and the bottle component, the coupling arrangement incorporating a space or channel through which the protruding element can pass to extend from inside to outside the bottle.

Preferably, the teat component and container component couple directly to one another by means of the coupling arrangement.

For example, the coupling arrangement may comprise a screw coupling comprising complementary thread portions on outer and/or inner surfaces of the teat component and container component respectively. Each of the thread portions may be a thread ring extending around the rim of the teat component and container component respectively.

At least one of the thread portions may be circumferentially discontinuous to thereby define at least one circumferential gap in the threads, the gap arranged to accommodate passage of the protruding element. Preferably only one of the thread portions is discontinuous, and the other one continuous, so that coupling between the two can always be performed regardless of the relative orientation between the two.

Circumferential means a direction around the periphery of the container component or the teat component.

One of the thread portions may be adjacent an upper rim of the container component. The internal element may be configured to be positioned within the bottle volume at a location at or above said upper rim of the container component, and wherein the protruding element is configured to downwardly extend from the internal element through the gap defined in the threads.

A second of the thread portions may be adjacent a lower rim of the teat component for threadably coupling with the first thread portion to thereby screw couple the teat component onto a top of the container component, thereby enclosing the internal volume of the bottle.

A further aspect of the invention will now be outlined. Again, features set out in relation to this aspect can be applied equally to embodiments of any other aspect of the invention.

According to a further aspect of the invention, there is also provided an internal element for a feeding bottle, the feeding bottle comprising a teat component, and a container component, which together define a bottle volume extending longitudinally between a base end of the container component, and a top end of the teat component, the internal element comprising a disc element configured to be positioned within the bottle volume extending transverse the longitudinal axis, and further comprising one or more tab elements protruding from an outer periphery of the disc element for being received between interfacing parts of a coupling arrangement of the bottle.

The bottle volume may have a longitudinal axis extending from said base end to said top end.

The receipt of the tab elements is for at least partially securing the internal element against movement when the bottle is assembled.

The coupling arrangement provides coupling between at least two components of the bottle, for example between the teat component and the container component.

The internal element may traverse the cross-section of the volume.

The one or more tab elements may be configured to be trapped between interfacing surfaces or parts of the coupling arrangement for example.

The one or more tab elements may comprise flaps or tabs for example. They form flange tabs or flange flaps, meaning that they protrude beyond an outer envelope outline of a boundary of the disc element. They are for being received between engaging parts or surfaces of a coupling.

The one or more tab elements and disc element may be integral parts of a single unitary component forming the internal element.

There may be a plurality of tab elements or a single tab element. Preferably in either case the set of one or more tabs is arranged to define a circumferentially symmetric pattern or arrangement so that circumferentially symmetric physical support is provided around the disc element by the tabs. This could be by providing one or more pairs of tabs, each pair comprising tabs at diametrically opposite positions. Alternatively, a single annular tab may be provided which extends the whole way around the periphery of the disc element. This may thus form a skirt or ring flange for example.

The receipt within the coupling arrangement may be for trapping the element, for holding the element in position.

When received in the coupling, the internal element may thereby be secured against movement in at least one direction. For example, the one or more tab elements may be trapped so that movement is prevented or restricted at least in a direction of the bottle longitudinal axis.

This provides a function of preventing the disc being folded into the bottle by high pressure that may be exerted on the element by the coupling, e.g. a screw ring.

The internal element can be for different functions in different embodiments. It may be a support element and provide a support function. For example it may support a further protruding element extending from the internal element which extends to the outside of the bottle when assembled. The protruding element may provide a visual indicator of bottle orientation for example, or it may facilitate electrical or data communication between the inside and outside of the bottle.

The internal element may be an internal element in accordance with any of the examples or embodiments discussed above or described in the next section.

In further examples, the internal element may form a partitioning component for fluidly dividing the internal volume into two longitudinal sections. It may for example take the form of any of the example partitioning components discussed above, or described in the next section.

In some embodiments, the plurality of tab elements may be for being received between interfacing parts of a coupling arrangement which couples the teat component to the container component.

In some embodiments, the internal element may be configured to be positioned at an interface or junction between the teat component and the container component of the bottle.

The disc of the internal element may define a plane, and wherein the tab elements extend obliquely with respect to the plane.

This allows them for example to hook over the top of an upper edge or rim of the container component in examples where the disc is configured to be positioned at or above this edge or rim within the volume.

In some embodiments, the disc of the internal element may define a plane, and wherein the tab elements are resiliently bendable in a direction oblique to the plane.

In some embodiments, at least the tab elements may be formed of a resilient or elastic material, for example an elastomeric material.

Additionally or alternatively, in some embodiments, at least an outer rim portion of the internal element may be formed of a resilient or elastic material, for example an elastomeric material.

According to one or more embodiments, the one or more tab elements may each comprise one or more protrusions or bosses formed on at least one face of the tab element.

These protrusions provide additional friction for increasing a friction between the tab elements and the coupling arrangement within which they are received. This helps with even more securely retaining the internal element in position, against movement, once the bottle is assembled with the tab elements received within the coupling arrangement.

In some embodiments, the internal element may be a partitioning component for fluidly dividing the bottle volume into two longitudinal sections, a teat section extending from the top end of the bottle to the partitioning component, and a container section extending from the partitioning component toward the base of the bottle.

The partitioning component may comprise a fluid passageway arrangement comprising one or more openings for permitting flow of fluid across the partitioning component.

Examples in accordance with a further set of embodiments also provide a feeding bottle, comprising:

a teat component, and a container component, the components together forming a bottle volume, the bottle volume extending longitudinally between a base end of the container component, and a top end of the teat component; and an internal element or an arrangement in accordance with any example or embodiment outlined above or described below, or in accordance with any claim of this application, positioned within the bottle with the disc element of the internal element arranged extending transverse the longitudinal axis.

The container component may be tubular in some examples.

In some examples, the coupling arrangement may comprise a screw coupling between the teat component and the container component, for directly or indirectly coupling the teat component to the container component.

For example, the screw coupling may comprise a screw ring, meaning a coupling formed of complementary rings of screw threads provided on engaging surfaces of the coupled components.

The one or more tab elements may be configured to be received between threads of the screw coupling. By this is meant that the one or more tab elements are for example received within grooves formed between individual thread ribs or protrusions of the threads.

In some embodiments, the screw coupling may comprise complementary thread portions provided on outer and/or inner surfaces of the teat component and container component respectively, one of the thread portions being located adjacent an upper edge of the container component.

This means that the internal element can extend across an open upper end of the container component, for example sitting on top of the upper edge of the container component, with the one or more tab elements protruding radially beyond the edge of the container component for being trapped in the threads of the screw coupling.

In some embodiments, at least one of the thread portions may extend discontinuously around the perimeter of at least one of the teat component and container component, to form multiple circumferentially spaced thread sections, and wherein the internal element comprises a respective tab element for each of the thread sections. Preferably, only one of the thread portions is discontinuous, and the other is continuous, so that the two can be threaded together regardless of the rotational position of the discontinuous one.

Examples in accordance with a further set of embodiments also provide an arrangement for a feeding bottle, comprising:

the internal element in accordance with any example or embodiment outlined above or described below, or in accordance with any claim of this application; and a protruding element arranged for extending from the internal element to an outside of the bottle when the bottle is in an assembled state, for providing an interconnection between the inside and outside of the bottle.

An assembled state means a state in which the internal element is in position in the volume, and the teat component and the container component are assembled together to form the bottle volume. They may couple directly or indirectly to one another.

In embodiments in which the internal element is a partitioning component, the protruding member may be for providing a visual indication of an orientation of the partitioning component relative to the bottle, for example an orientation of the passageway arrangement relative to the bottle.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1A:
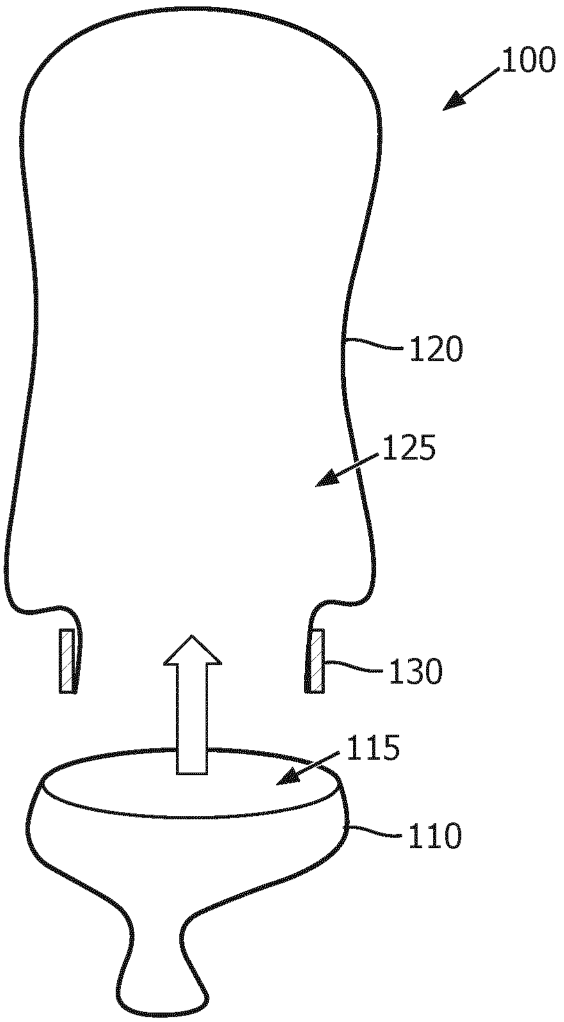
FIG. 1*a* and FIG. 1*b* shows the basic components of a feeding bottle, and assembly of a feeding bottle.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

One aspect of the invention provides a partitioning component for dividing a feeding bottle into two sections: one associated with a container part of the bottle and one associated with a teat part of the bottle. The partition allows for at least partial retention of liquid in the teat part even when the bottle is tipped in a horizontal position, the more natural position for feeding a user such as a baby or toddler. To enable flow of fluid between the two sections, the partitioning component comprises a passageway arrangement which comprises one or more openings and the passageway arrangement configured to enable flow of both liquid and air across the partition in different directions. This allows liquid to pass in, and air to pass out, of the teat section during filling of the teat. To enable maximal retention of liquid inside the teat section when the bottle is tilted in the horizontal position, the openings of the passageway arrangement are all confined to a single region of the partitioning component which, in use, is arranged offset on one diametric side of the bottle volume or of the teat volume.

Figure 1B:
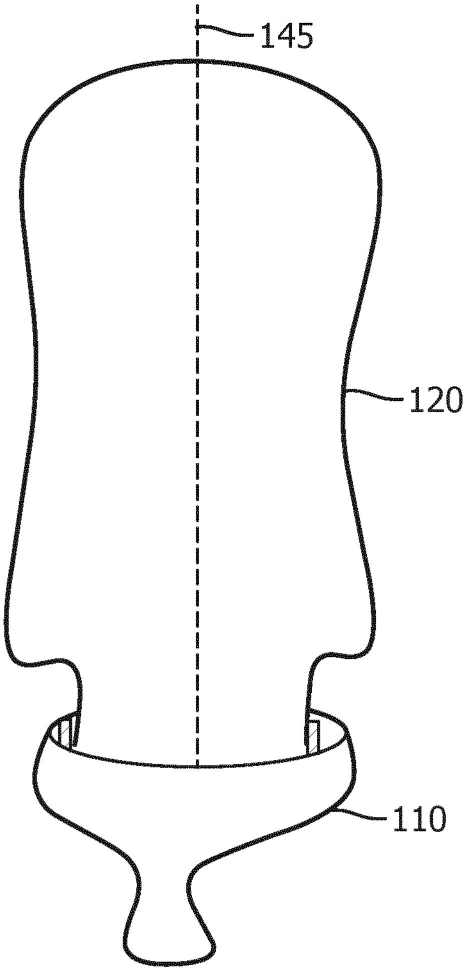

FIG. 1*a* and FIG. 1*b* illustrates a feeding bottle device 100 in an unassembled (FIG. 1*a*) and assembled (FIG. 1*b*) state in cross-sectional view. Feeding bottle device 100 comprises a teat component 110, which is attached to a container component 120 by means of an attachment component 130. The attachment component may for example be in the form of a locking ring. It may comprise a screw thread. Other possibilities are also possible such as a friction fit coupling for instance.

The teat component 110 defines a teat volume 115 therein. The container component 120 defines a container volume 125 therein. When the bottle 100 is assembled, the teat volume and container volume together form a total enclosed volume of the bottle. The bottle has a longitudinal axis 145 parallel with the length of the container, the axis illustrated by dotted line 145. The bottle has a base at one longitudinal end, the base defined by an end wall of the container component, and a top end at the other longitudinal end, formed by the teat component.

Usually, feeding bottle device 100 and more precisely a container volume 125 within container component 120 is filled with a liquid food, such as milk, which is then fed to an infant out of teat component 110. For this purpose, feeding bottle device 100 in the assembled state illustrated in FIG. 1*a* and FIG. 1*b* is maintained at an angle which allows milk or other liquid to enter the teat volume 115 within teat component 110. The position in FIG. 1*a* and FIG. 1*b* corresponds to an operating position, in which feeding bottle device 100 is inclined such that a teat component 110 points downwards at a certain angle such that liquid enters a teat volume 115.

The inclination shown in FIG. 1*a* and FIG. 1*b* is unfavorable since it differs from a natural feeding position of an infant, which is substantially horizontal, and since it favors the infant's swallowing of air. Nevertheless, despite being unfavorable, feeding with the illustrated inclination is classically performed in order to keep teat volume 115 filled with liquid and not with air through gravity even if a liquid level within container component 120 drops.

To allow a more horizontal feeding, embodiments in accordance with the present invention provide a partitioning component 210 arranged to fluidly divide the bottle volume into two longitudinal sections, a teat section extending from the top end of the bottle to the partitioning component, and a container section extending from the partitioning component toward the base of the bottle.

FIG. 2 illustrates a first example embodiment in accordance with one aspect of the present invention.

The partitioning component 210 is shown in FIG. 2.

The partitioning component 210 comprises a fluid passageway arrangement 215 comprising one or more openings 225 for permitting flow of fluid across the partitioning component.

Figure 2A:
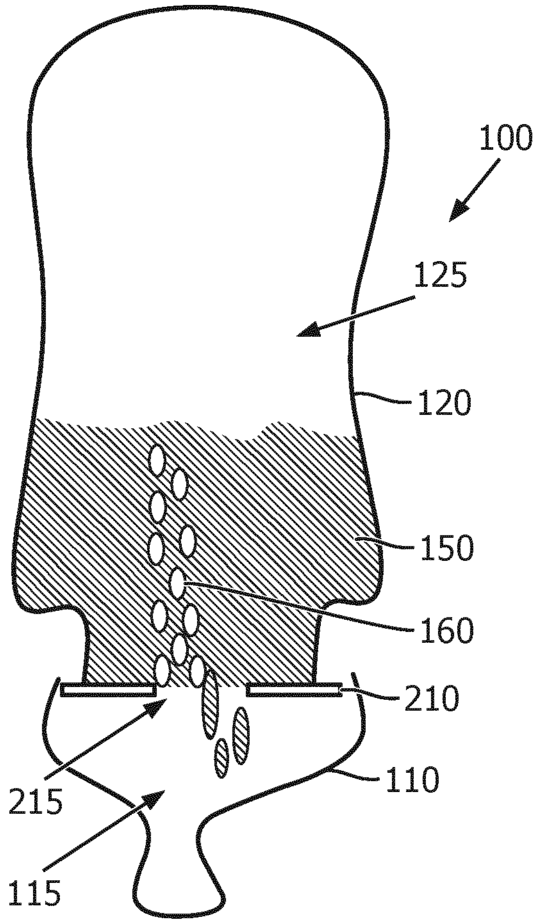
FIG. 2*a* shows a first embodiment with the bottle in an upside-down position for filling the teat section with liquid.
Figure 2B:
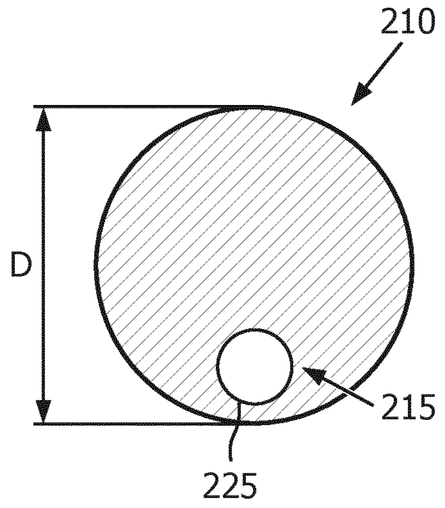
FIG. 2*b* shows a plan view of the partitioning component according to the first embodiment.

The passageway arrangement 215 is located offset from a center of the component (indicated by a cross illustrated at the center of the component in FIG. 2*b*), on one diametric side of the partitioning component, and wherein the remainder of the partitioning component is fluid impermeable. A diametric dimension, D, of the partitioning component 210 is indicated in FIG. 2*b*.

The passageway arrangement 215 is configured to permit flow of both liquid and air in different directions across the partitioning component.

The partitioning component in this example is illustrated as located at the interface between the container component 120 and the teat component 110. As such, the teat section and container section correspond in this case respectively to the teat volume 115 and container volume 125 referred to previously, and thus these integers may be referred to interchangeably in the descriptions to follow.

However, the partitioning component can be positioned at any point along the longitudinal length of the bottle, for example it may be further inside the length of the container toward the base end, or may be further inside the teat component. In these cases, the teat section and container section may not correspond exactly to the teat volume 115 and the container volume 125.

The partitioning component 210 for example comprises a membrane or disk extending radially across the bottle volume between the inner walls of bottle.

The partitioning component 210 has a diametric or radial dimension, D, associated with it. It may have a uniform diameter or radius (e.g. in the case of a circular component), or the radius or diameter may vary in length as a function of angle about a center point of the component (e.g. oval or elliptical component). The outer boundary of the component may be generally round, e.g. an outer envelope is generally round, but shaped to match a shape of the outline of the inner walls of the bottle between which it extends. For example it may have a polygonal outer boundary shape in some examples.

The partitioning component 210 is configured to be arranged in the bottle with the diametric dimension extending obliquely to the bottle longitudinal axis, for example extending perpendicularly to the longitudinal axis 145.

The passageway arrangement 215 in this example is shown comprising a single opening 225, located adjacent one edge of the partitioning component, and configured to permit flow of both liquid and air in different directions across the partitioning component. As shown, there are no other openings in the passageway arrangement, so that at least one whole diametric side of the partitioning component is fluid impermeable. In this example, the passageway arrangement 215 is at a distance from an outer boundary of the partitioning component no greater than one quarter of the diametric height, D, of the partitioning component 210.

However, as will be seen from the embodiments discussed below, this is represents one example only, and the configuration of the passageway arrangement 215 may differ in different embodiments.

Functioning of feeding bottle device 100 is as described as follows. A caregiver assembles feeding bottle device 100 by usually inserting teat component 110 into attachment component 130, optionally then covering this assembly using a cap (not shown). Container component 120 is filled with milk or other liquid food and then partitioning component 210 is provided in the opening of container volume 125 before attachment component 130 is attached to container component 120, for instance by screwing it on.

After assembly, the filling of the teat section 115 is schematically and exemplarily illustrated in FIG. 2*a*. The feeding bottle 100 is turned upside down, i.e. teat component 110 is facing vertically down, to allow the teat section 115 to be filled with milk or other liquid 150 provided in container component 120. The passageway arrangement 210 permits flow of liquid 150 into the teat section 115, and simultaneous flow of air 160 outward from the teat section into the container section 125. Air 160, which previously was present in teat volume 115, can thus escape teat volume 115 through the passageway arrangement 215, and liquid 150 present in container volume 125 can at the same time pass into teat volume 115.

Once teat volume 115 is filled, feeding of the infant (or baby, or other user) can start.

Figure 2C:
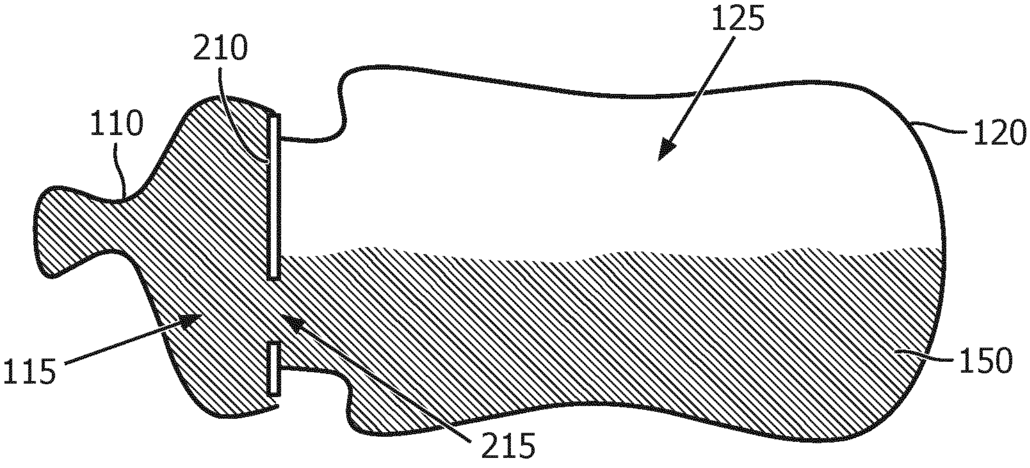
FIG. 2*c* shows the first embodiment with the bottle in a horizontal, feeding position.

FIG. 2*c* schematically and exemplarily illustrates a feeding position in which feeding bottle device 100 is positioned substantially horizontally. Teat volume 115 is completely filled with liquid and liquid drawn from teat component 110 by the infant is replaced through the passageway arrangement 215 with liquid 150 from the container volume 125.

Due to the fact that the passageway arrangement 215 is offset from the center on one diametric side, this means that a majority area portion of the partitioning component, extending diametrically above the passageway arrangement 215 is fluid impermeable, and thus does not allow leakage of fluid out from the teat section. This means that the volume of liquid 150 received in the teat section 115 after filling is effectively retained inside the teat by the fluid-impermeable major region of the partitioning component 210. As such, a filled teat can be maintained, making it easier for a user to draw fluid even in the horizontal position, and avoiding the possibility of air becoming trapped at an upper region of the teat section.

The only fluid communication between the teat section 115 and the container section 125 is via the passageway arrangement 215. Since this is positioned in an eccentric, offset position, it means that this arrangement is generally always located beneath a level of the liquid 150 in the container section. As such, ingress of air into the teat section in the horizontal position, from the container section, is avoided, since only the liquid is in communication with the passageway arrangement. However, more liquid can be continuously drawn in to the teat section as the infant or other user feeds, to thereby keep the teat section 115 filled with liquid.

Thus it can be seen the configuration of the passageway arrangement 215 enables inflow of liquid and outflow of air during filling of the teat, and furthermore enables effective retention of received liquid filling the teat section 115 when in the horizontal position.

The bottle may comprise a further fluid passage arranged to provide fluid communication between an outside of the bottle and the container section of the bottle volume. This allows air to enter the container section as liquid is drawn from the bottle through the teat.

The further fluid passage may for example comprise an inlet (e.g. valve) in the teat component fluidly connected to an outside of the bottle, and further fluidly connected (e.g. via a connection pipe or conduit) to the container section (for example by-passing the teat section). In one set of embodiments for instance, the inlet may be fluidly connected to the container section via a passageway that runs at least in part through the body of the partitioning component. For example the partitioning component may comprise a fluid inlet arranged to fluidly couple with the fluid inlet or valve in the bounding wall of the teat section when the bottle is assembled, and to channel air from this inlet through a conduit running through at least a part of the partitioning component body, and then out through an outlet fluidly coupled with the container section of the volume when the bottle is assembled. This outlet is preferably arranged on a diametrically opposite side of the partitioning component to the passageway arrangement 215. For example, the fluid conduit may extend in a circumferential path around at least a portion of the partitioning component to deliver air to the outlet into the container section. It may therefore provide a fluid guidance ring. The fluid conduit does not provide fluid communication between the container volume 125 and the teat volume 115, but by-passes this teat volume.

The fluid outlet to the container component may comprise an extended channel section which extends a certain distance longitudinally into the container component so that the air is delivered at a region of the container component further towards a base of the container. This may avoid the air entering any liquid collected at a top of the container volume, for example when the bottle is tilted toward the teat during drinking.

Alternatively an air inlet (e.g. valve) may be provided in the container component providing fluid connection between the outside of the bottle and the container section 125 of the volume to permit entry of air as fluid leaves the container component.

As noted, the passageway arrangement 215 is configured to permit simultaneous flow of liquid and air in opposite directions across the partitioning component.

In particular, the one or more openings of the passageway arrangement are sized and shaped to provide two simultaneous fluid flow-paths, separated spatially, to permit said flow of both liquid and air.

In the example of FIG. 2, the passageway arrangement 215 consists of a single opening 225 (preferably a through-hole in the partitioning component 210) which is of sufficient size to provide two flow paths in opposite directions through the opening at the same time.

By way of non-limiting, example, it has been found in one set of experiments by the inventors that a single opening of diameter greater than 10 mm is sufficient for two flow paths to be reliably provided across the opening. More preferably, the single opening may be provided with diameter greater than 12 mm, for example greater than 14 mm. These represent one example range of dimensions which may be advantageous in accordance with one or more embodiments. However, opening sizes smaller than those set out above may also be functional, and the optimal size for the opening may depend upon the size of the bottle volume (and hence the likely liquid pressure through the holes) and also the materials of the partitioning component. Thus the above example dimensions are not limiting for the inventive concept.

In further examples, multiple openings may be provided, and wherein at least one of the openings has a diameter of at least 10 mm, for example at least 12 mm, for example at least 14 mm.

Figure 3A:
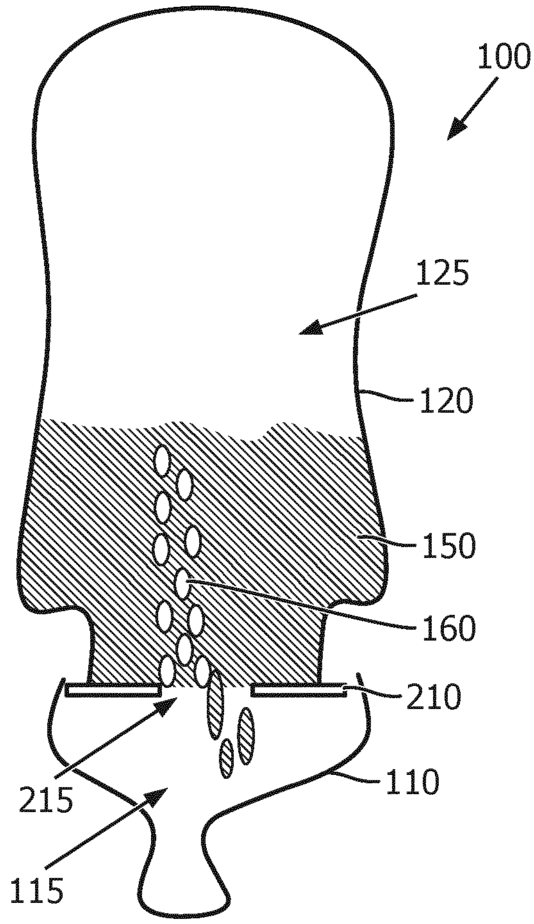
FIGS. 3*a*-3*c* show views of a further example embodiment having a passageway arrangement with an elongated opening.
Figure 3B:
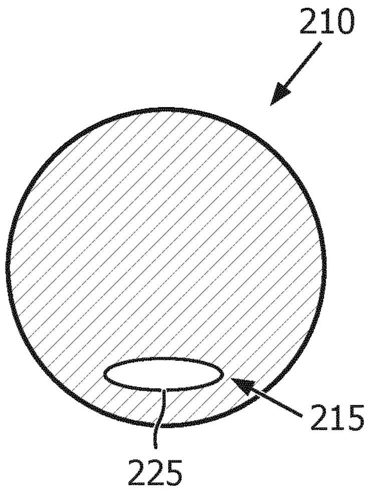
Figure 3C:
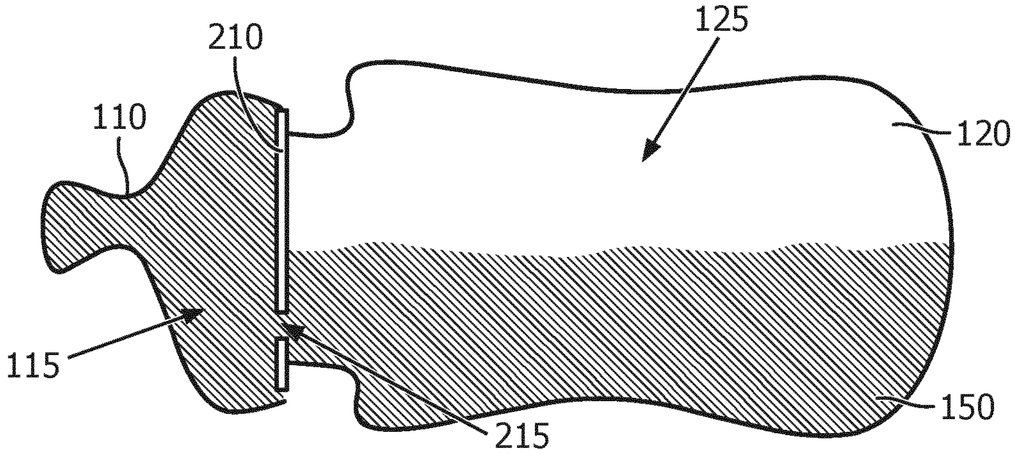

FIG. 3 illustrates a variation on the embodiment of FIG. 2. This embodiment is the same as that of FIG. 2 in all respects except that the single opening 225 of the passageway arrangement 215 is elongate, i.e. is longer in one dimension ('elongate dimension') than it is wide.

Making the opening elongated will result in a greater flow area and thus an improved fluid flow, without any need to the need to bring the hole closer to the center of the partitioning component Moreover, the elongate hole better enables the spatial separation of the liquid and air flowpaths. As mentioned above, preferably the passageway arrangement, even where it comprises only a single opening 225, is sized and shaped to provide at least two simultaneous (independent) flowpaths separated in space, to thereby allow the independent passage of liquid into the teat section 115 and air out of the teat section 215 during filling. An elongate hole makes this easier, and may provide greater spatial separation between these flow paths, potentially enabling the flow of each (air and liquid) to be increased.

Figure 4A:
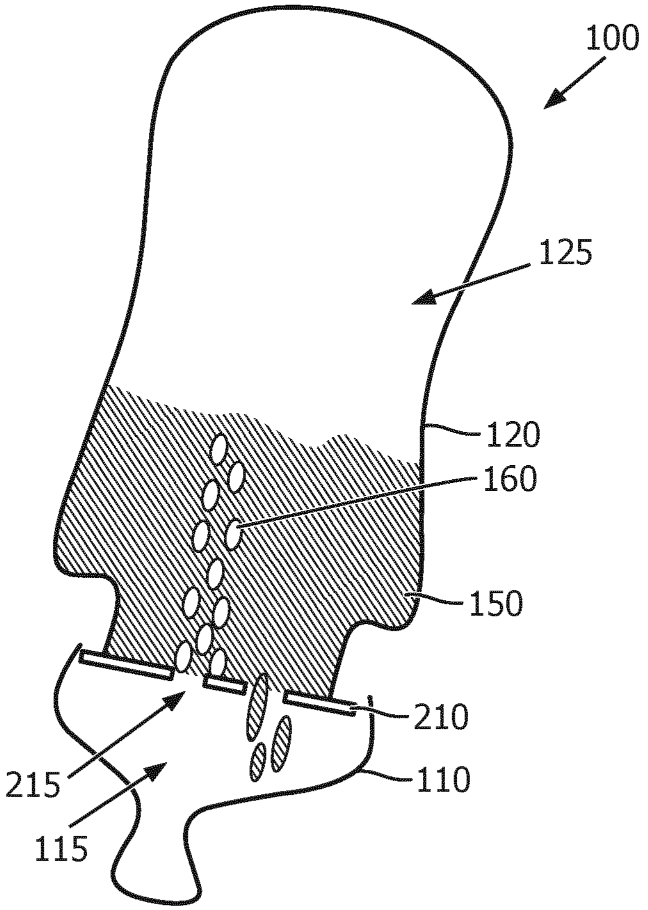
FIGS. 4*a*-4*c* show views of a further example embodiment having a passageway arrangement with two adjacent openings.
Figure 4B:
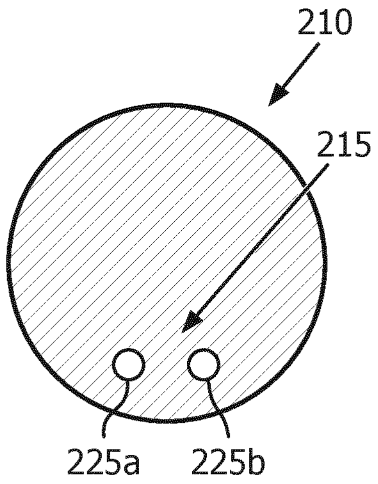
Figure 4C:
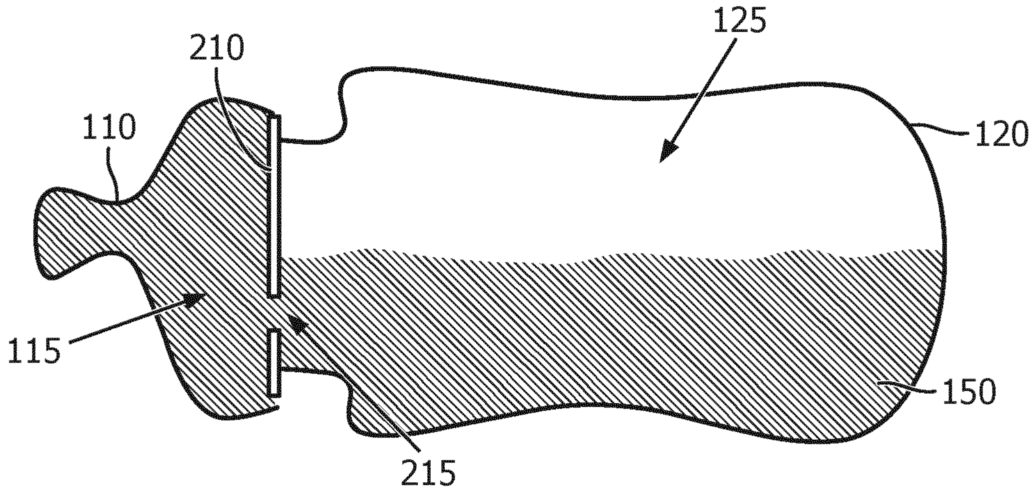

A further possible embodiment is shown in FIG. 4.

This is again the same in all respects as that of FIG. 2 or 3, except that in this case the passageway arrangement 215 comprises a pair of two openings 225*a*, 225*b*, spaced close together. Preferably the openings are through-holes in the partitioning component.

Where two openings are provided, these may each be provided at a smaller diameter compared to the single opening of the embodiments of FIGS. 2 and 3 without loss of functionality.

Preferably the two holes are substantially the same size (e.g. substantially the same cross-section and/or surface area). Substantially means for example with less than 10% or 5% difference in size.

Providing two separate holes that are close together on the same side of the partition 210 further improves the flow as this arrangement tends to encourage the liquid and air to spontaneously separate in their flows between the two holes, and to therefore respectively flow through different of the holes, especially if the bottle is tilted slightly. In other words, the dual-hole arrangement encourages the two fluid types to 'choose a side'.

Thus, this better ensures spatial separation of the flow paths for air and liquid respectively, since each of these two fluid types is typically flowing selectively through only one of the holes. Thus, flow can be improved.

It is noted that multiple flowpaths are still provided by the single-hole embodiments discussed above, but depending upon the orientation of the bottle and the levels of the fluid, sometimes these can partially or temporarily interfere. Separate holes can potentially better prevent this from happening.

However, on the other hand, a single hole may be preferable from a manufacturing perspective, since it is easier and faster to form a single hole than two separate holes. A single hole may also be easier to clean, thus improving user convenience and hygiene.

Figure 5A:
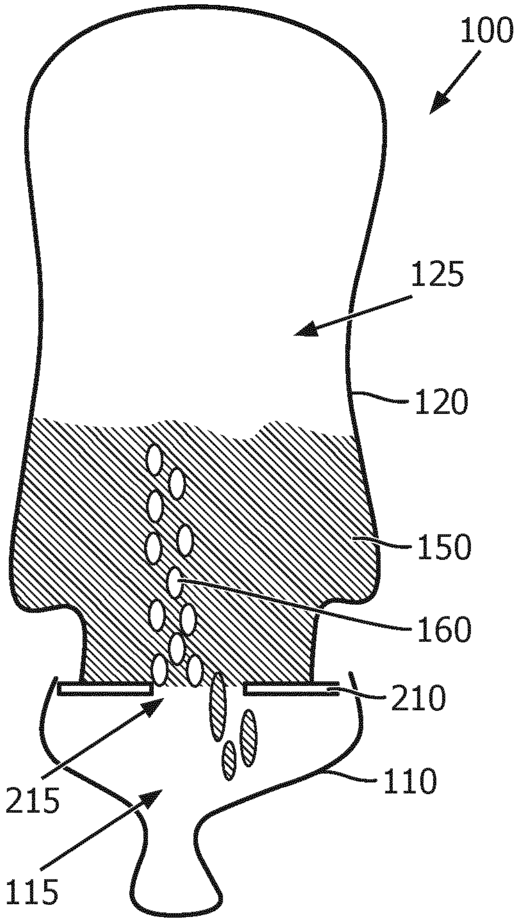
FIGS. 5*a*-5*c* show views of a further example embodiment having a passageway arrangement with an opening formed by a cut-out from the side edge.
Figure 5B:
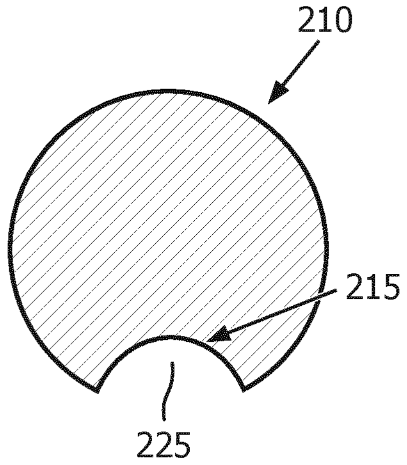
Figure 5C:
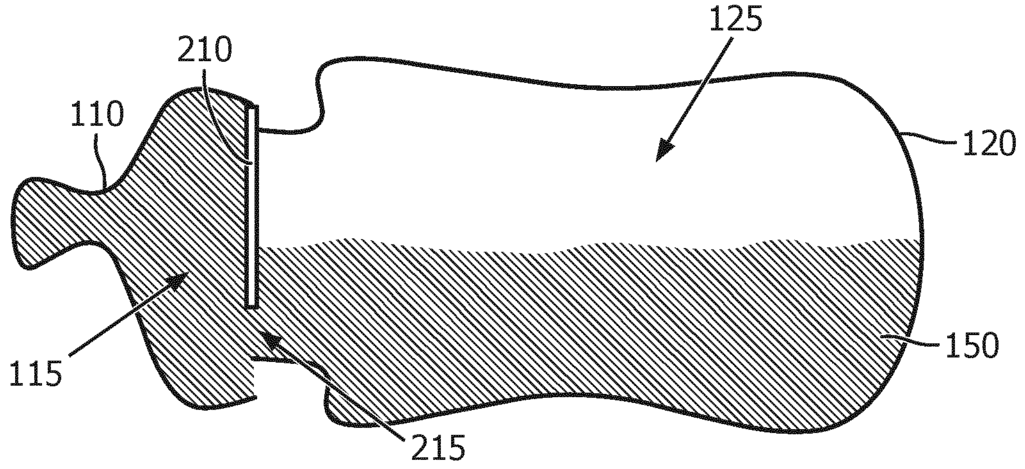

FIG. 5 shows a further example embodiment.

This embodiment is ag,ain the same in all respects as previously described embodiments apart from the configuration of the passageway arrangement 215. In this embodiment, the passageway arrangement comprises a single opening 225, but formed by a cut-out section, cut into the side edge of the partitioning component 120. The cut-out in this example has an arcuate boundary on one side, extending concavely into the body of the partitioning component 210.

The cut-out thus takes the form of indent in the rim of the partitioning component, the indent defining the opening 225, with the opening being bounded on one side by the remainder of the partitioning component, and on the other side by part of the inner wall of the bottle 100 (when in position, during use).

Thus, in this embodiment, the single opening 220 is formed at the very side edge of the partitioning component itself. It is thus located maximally off-center, in a maximally eccentric position. This therefore maximizes the area of the partitioning component which is fluid impermeable, thus maximizing the area which can act to retain liquid inside the teat section 115 when the bottle is in a horizontal position (shown in FIG. 5*c* for example). More specifically, it maximizes the diametric height of the section of the partitioning component which acts as a retaining wall against liquid escape from the teat in the horizontal position. This means, the teat can continue to be maintained filled even with the liquid level in the container section 125 at a very low level.

Although the example of FIG. 5 has a single opening formed as a cut-out, in further embodiments, multiple openings 225 may be provided, each similarly formed from a cut-out into the side wall of the partitioning component.

A further set of embodiments is illustrated in FIG. 6.

In this set of embodiments, the passageway arrangement 215 comprises a plurality of openings 225, and wherein the openings are arranged to be at different heights along a longitudinal axis of the bottle.

Figure 6A:
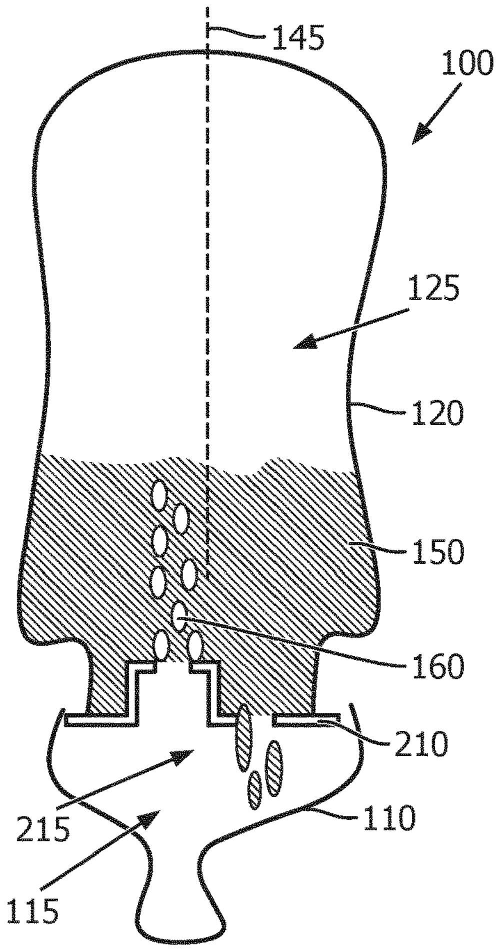
FIGS. 6*a*-6*c* show views of a further example embodiment having a passageway arrangement comprising multiple openings arranged at different heights.
Figure 6B:
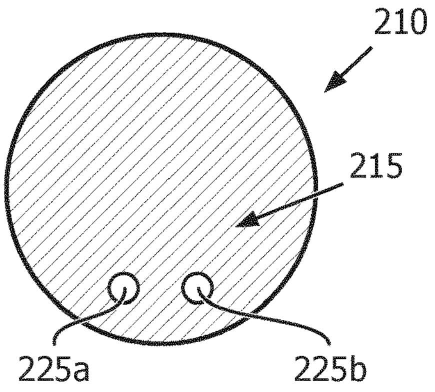
Figure 6C:
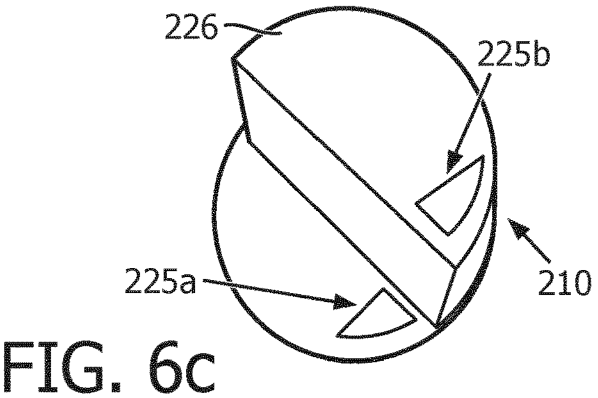

An example is illustrated in cross-section in FIG. 6*a*, in plan view in FIG. 6*b* and in perspective view in FIG. 6*c*.

In this example, the passageway arrangement 210 comprises two openings 225*a*, 255*b*, a boundary of a first 225*a* of the openings arranged to be at a first height, and a boundary of a second of the openings 225*b* arranged to be a different, greater height. Height in this case means a height along a direction of the longitudinal axis 145 of the feeding bottle 100 or a height along an axis normal to a plane defined by the partitioning component. Thus, in this example, the first 225*a* of the openings is arranged to be closer to the teat 110 and the second of the openings 225*b* is arranged to be closer to the base end of the container 120.

The difference in the opening heights is facilitated in this example by providing a partitioning component 210 having an extruded portion 226 on one side, the extruded portion having a upper surface which is at a raised height relative to the upper surface of the other side of the partitioning component (the flat side), and wherein the second (higher) 225*b* of the openings being formed in the upper surface of the extruded portion 226.

The first (lower) 225*a* opening is formed in the non-extruded, flat side of the partitioning component 210.

Providing openings at different heights further assists with the provision of the dual flow paths for simultaneous passage of air and liquid. This is because the different heights further encourages the two fluid types (air and liquid) to selectively flow each through a different one of the holes. It in other words further encourages the two fluid types to 'choose a side' through which to flow. Due to the different heights, this happens spontaneously without the need to tip the bottle to initiate the flow separation. Thus, this better ensures separation of the flow paths for air and liquid respectively, since each of these two fluid types typically flows selectively through only one of the holes. Thus, flow can be improved.

Figure 6D:
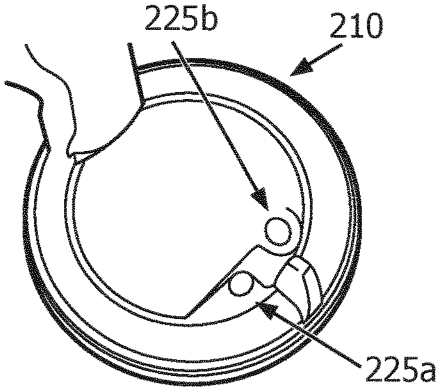
FIG. 6*d* shows a further example having multiple openings at different heights.
Figure 6E:
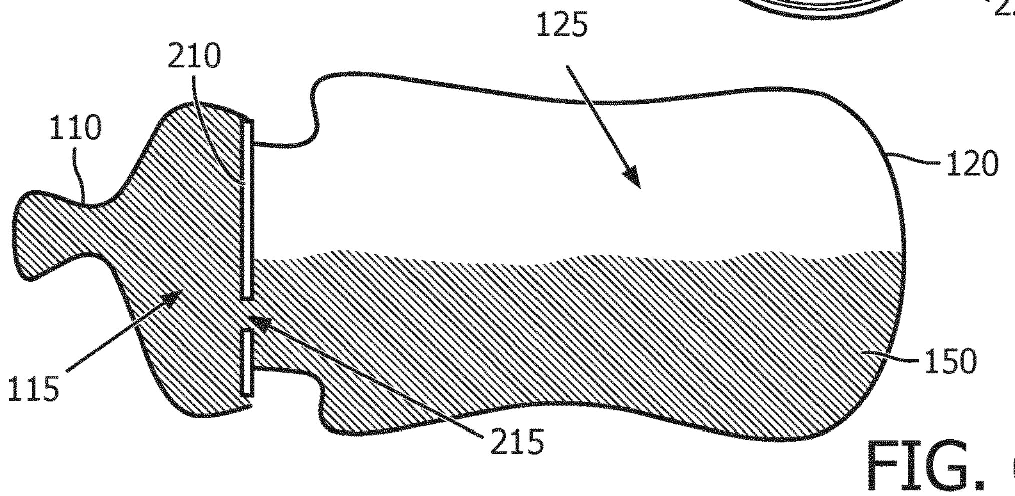
FIG. 6*e* shows a further view of the embodiment of FIGS. 6*a*-6*c;*

Another example of this set of embodiments is illustrated in FIG. 6*d*. This example also comprises a passageway arrangement 215 comprising two openings 225*a*, 225*b*, with the two openings elevated at different heights along the direction of the longitudinal axis 145 of the bottle (when the bottle is assembled with the partition arrangement 210 in place). In this example, the upper surface of the partition arrangement 210 is contoured or profiled so as to define a slope which inclines from one portion of the outer boundary of the partitioning component 210 to an elevated height, and wherein one of the openings 225*b* is formed in the upper surface at said elevated height. A first 225*a* (lower) of the two openings 225*a* is formed in a lower, flat section of the partitioning component upper surface, with the sloping, contoured part surrounding this flat part, with a vertical wall bridging the gap in heights between two regions.

The two openings in this example are directly adjacent in a radial or planar dimension, but separated height-wise (i.e. in a longitudinal or axial dimension). The height distance between the two holes is greater than the distance between them in the radial or planar direction.

The sloping of the upper surface away from the raised opening 225 in this example effectively provides a funnel shape which encourages flow of air out of the teat though the upper opening 225 when the bottle is held in the upside-down position during filling (as in FIG. 6*a*), and encourages flow of liquid out of the teat section when held upright during emptying of the teat section after feeding. The sloping could alternatively be provided in the inverted direction to instead encourage liquid flow in to the teat during filling and flow of air into the teat during emptying.

The multiple heights can be provided by the passageway arrangement, even in the case that it comprises only a single opening.

Figure 7A:
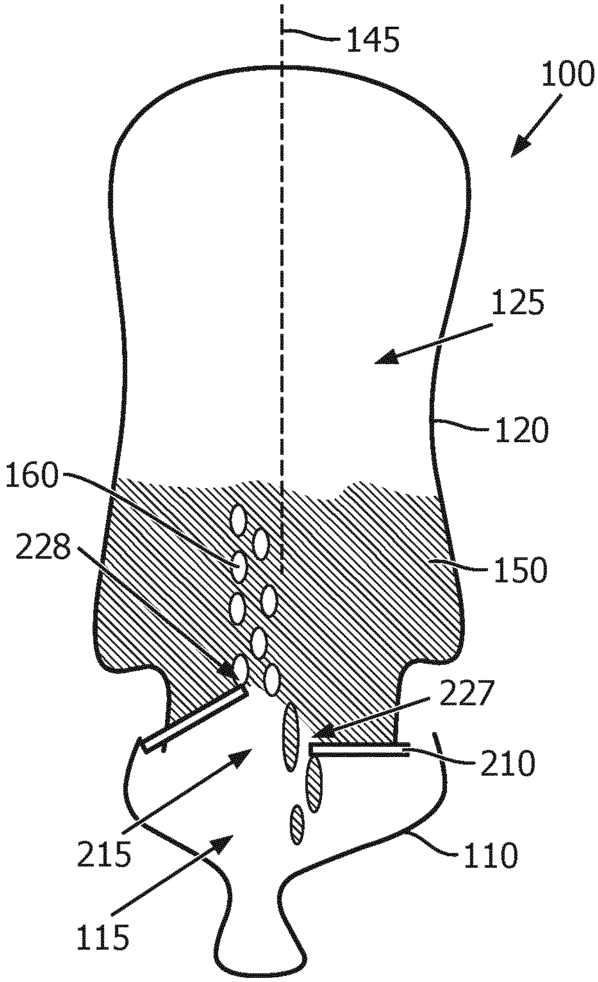
FIGS. 7*a*-7*c* show views of a further example embodiment having a passageway arrangement with a single opening having a boundary which is at different heights on opposing sides.
Figure 7B:
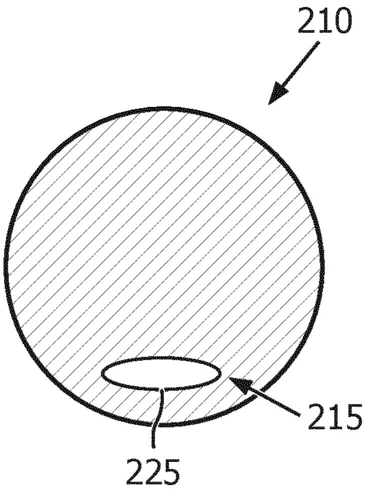
Figure 7C:
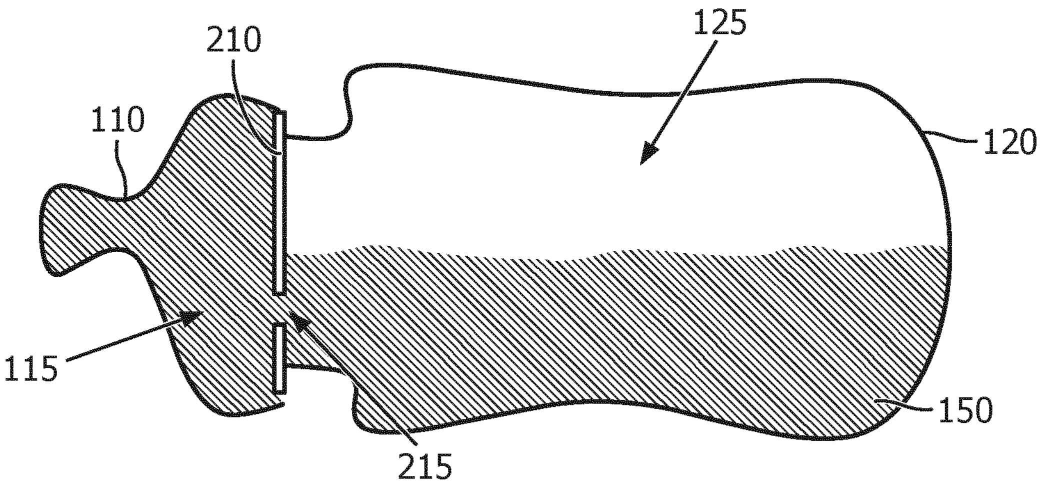

One example is shown in FIGS. 7*a*-7*c* for example. Again, this embodiment differs from previous embodiments only in respect of the passageway arrangement 215.

In this example, the passageway arrangement 215 comprises a single opening 225, and wherein a boundary of this opening has a split height. In particular, one side 227 of the opening is at a first height along the direction of the bottle longitudinal axis, and the other, opposing, side 228 is at a second, greater height.

In this particular example, the surface of the partitioning component 210 is arranged to slope or curve upwards to meet said higher side 228.

Due to the different heights of the two sides 227, 228 of the opening 225 boundary, this again encourages (spatial) separation of the flow paths of the air 160 and liquid 150, but without the need to provide more than one opening.

Preferably, the single opening 225 is elongate (as shown in FIG. 7*b*), which provides greater flow area for the fluids, which better facilitates the spatial separation of the flow paths for the air and liquid respectively.

Figure 8A:
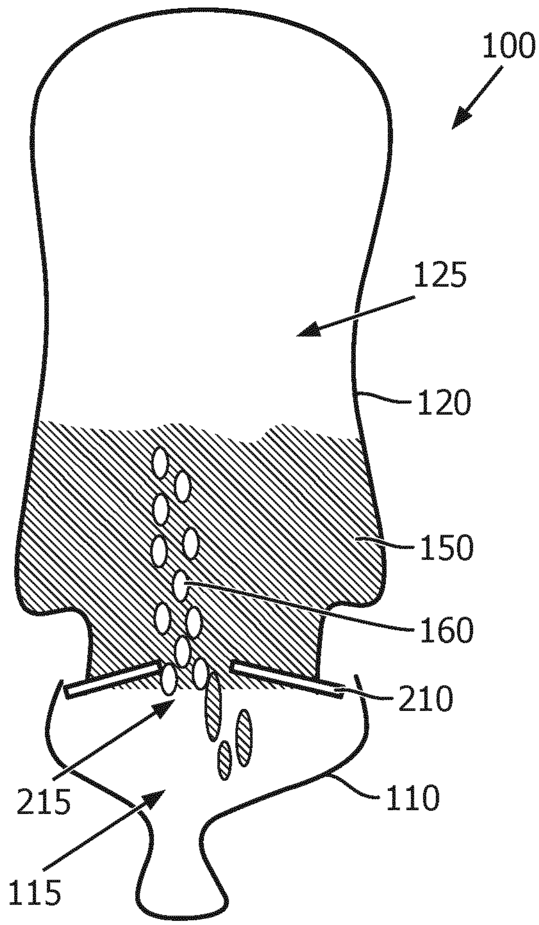
FIGS. 8*a*-8*c* show views of a further example embodiment having a passageway arrangement in which a surface of the partitioning component is sloped to define a funnel shape.
Figure 8B:
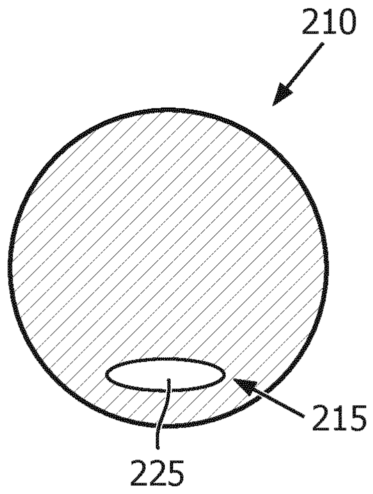
Figure 8C:
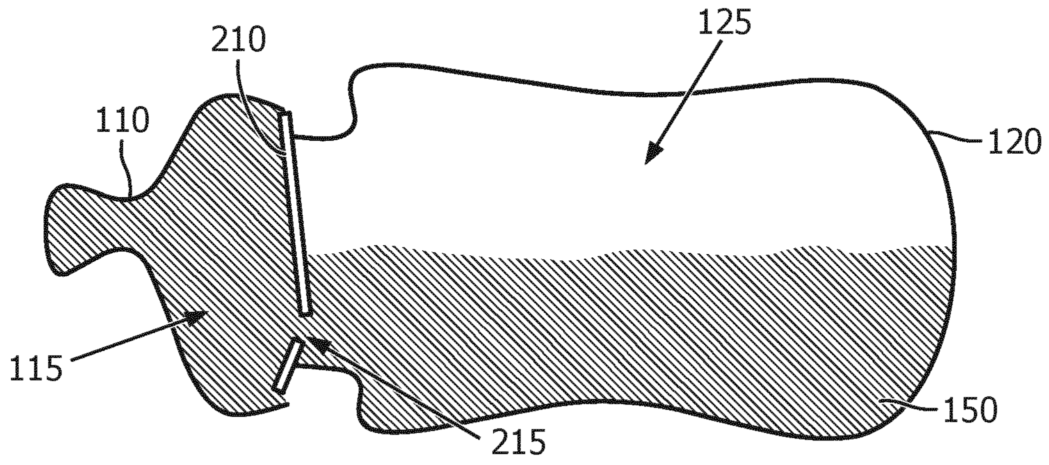

A further example embodiment is shown FIG. 8. This is the same in all respects as each of the previous embodiments, except for the arrangement of the fluid passageway arrangement 215.

In this embodiment, the passageway arrangement 215 comprises a single opening 225. The single opening in this example is elongate. The surface of the partitioning component 210 is arranged to slope or curve downward away from all sides of the opening 225 to thereby define a funnel shape around the opening 225.

The funnel shape provides a dual function: during filling of the teat (FIG. 8*a*) it encourages the air to flow out of the teat; during emptying of the teat (by tipping the bottle 100 upright), it encourages all of the liquid left in the teat section 115 to flow out of the teat section. It thus provides a fluid guidance function.

The sloping could alternatively be provided in the inverted direction to instead preferentially encourage liquid flow in to the teat during filling and flow of air into the teat during emptying.

A funnel shape such as this can be added to any one or more of the openings in any of the other embodiments described above to provide this fluid guidance function.

In accordance with any of the above described embodiments, the following represent possible advantageous features which may be incorporated. These features may be applied or incorporated to any embodiment of the invention described in this disclosure.

In accordance with one or more embodiments, the bottle volume has a cross-section perpendicular the longitudinal axis of the bottle and parallel to a diameter of the bottle volume, and wherein the passageway arrangement is arranged such that when the partitioning component is in place in the bottle for dividing the bottle volume, said passageway arrangement is confined to an area of the bottle volume, or the teat volume, extending across the bottle volume or teat volume cross-section by a distance no greater than one third of the diameter, with a remainder of the bottle volume cross-section providing no fluid communication between the container component and the teat component. The passageway arrangement need not be located within a single plane extending parallel with the bottle or teat volume diametric cross-section. In other words, it is the projection of the passageway arrangement onto the diametric cross-section of the bottle volume or teat volume that should, in this set of embodiments, be confined to a region extending across the cross-section by a distance no greater than one third of the diameter.

In some examples, the region (or projected region) containing the passageway arrangement may be a segment shaped section of the bottle volume or teat volume cross-section, having a segment sagitta of no greater than one third of a diameter of the bottle or teat volume cross-section.

In particular examples, the passageway arrangement may be confined to a segment of the partitioning component area, having a segment sagitta of no greater than one third of a diameter of the partitioning component.

In accordance with some examples, the region of the partitioning component 210 containing the passageway arrangement 215 may be limited in its area so that it extends from an outer boundary of the element across a radial distance of no greater than one quarter of a diameter, D, of the partitioning component, and preferably less than one fifth of the diameter, and more preferably less than one sixth of the diameter, and even more preferably less than one tenth of the diameter. The smaller the diametric height of the section containing the openings 225, the greater the fluid retention capability within the teat section 125 during use.

For example, the region containing the passageway arrangement may be segment shaped section, having a segment sagitta of no greater than one quarter of a diameter of the partitioning component, and preferably less than one fifth of the diameter, and more preferably less than one sixth of the diameter, and even more preferably less than one tenth of the diameter.

In advantageous examples, the region of the partitioning component 210 containing the passageway arrangement 215 may extend across less than one quarter of the total perimeter of the partitioning component, and preferably less than one fifth of the perimeter and preferably less than one sixth of the perimeter.

For example, the partitioning component may have a circumference, and the region containing the partitioning component may define a segment of the partitioning component, and wherein an arc length of the segment is less than one quarter of the total circumference/perimeter of the partitioning component, and preferably less than one fifth of the circumference and preferably less than one sixth of the circumference.

According to one aspect of the present invention, there may be provided just a partitioning component 210 in accordance with any of the embodiments outlined above, and wherein this component is configured to be affixed or otherwise fitted to the bottle 100 during assembly of the bottle. In some cases for example, the partitioning component is a membrane or disk component which sits in a receiving cavity or a supporting ledge at an interface between the container component 120 and the teat component 110, so that it can be simply placed in position during assembly of the bottle 100.

In accordance with a further aspect, there may be provided a feeding bottle 100 comprising:

a teat component 110, and a container component 120, the components being attachable to one another to form an enclosed bottle volume therein, the bottle volume extending longitudinally from a base end of the bottle, formed by the container component, to a top end of the bottle, formed by the teat component; and a partitioning component 120 in accordance with any example or embodiment outlined above or described below, or in accordance with any claim of this application.

In one set of embodiments, the partitioning component may be formed integrally with either the teat component or the container component.

In another set of components, the feeding bottle may include attachment means by which the partitioning component is retained in position in the bottle.

Although in examples, described above, the partitioning component is formed of a single unitary body, this is not essential. In accordance with one or more further embodiments, the partitioning component may comprise a plurality of parts, which may be connected, or may be spaced apart. This may be the case for example in examples in which the bottle container and/or teat is shaped such that the internal volume is asymmetric in cross-sectional shape along at least one region, or for instance divides into multiple channels. Here, to provide a partitioning component which successfully fluidly divides the bottle volume, the partitioning component must likewise be formed asymmetric or formed of multiple parts to span the different channels or regions of the internal volume.

Furthermore although in the embodiments discussed above, the passageway arrangement is formed at a location offset from a center of the partitioning component, on one diametric side of the partitioning component, this is not essential. More broadly, the passageway arrangement may be arranged such that when the component is in position in the bottle, the passageway arrangement is offset from a central axis of the bottle, e.g. a central longitudinal axis of the bottle, on one diametric side of the bottle.

More preferably, the passageway arrangement may be offset from a central axis of the teat component specifically, on one diametric side of the teat section 115 of the volume. In this way, the volume which can be retained in the teat section by the non-permeable part of the component is maximized.

Figure 9:
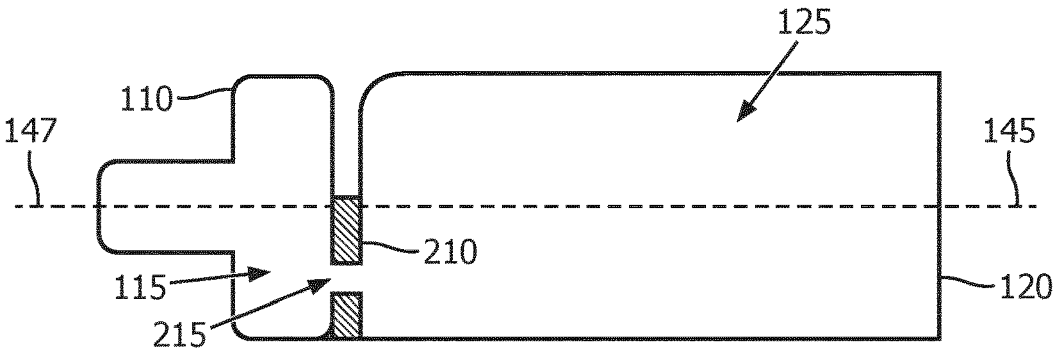
FIG. 9 shows a further example embodiment in which the partitioning component is asymmetric.

To illustrate this, one example is schematically depicted in FIG. 9. In this example, the container component 120 and the teat component 110 are joined together via-an off-center coupling, which forms a narrowed-width neck section of the bottle volume which is off-center with respect to the longitudinal axis 145 of the overall bottle volume. This narrowed width section is at the junction between the container component 120 and the teat component 110. The partitioning component 210 is located at the junction between the container component 120 and the teat component 110, positioned within the narrow width neck section. It comprises a passageway arrangement 215 which is approximately central within the partitioning component itself, but which is offset from a central longitudinal axis of the bottle volume 145, and more particularly, is offset from a central axis 147 of the treat component 110, on one diametric side of the teat section of the bottle internal volume. (In this example the teat volume central axis 147 and overall bottle central axis 145 are aligned, but this may not always be the case)

In some embodiments, the partitioning component may be an integral part of the teat component or container component.

Examples will now be described in accordance with a further aspect of the invention. Features of these embodiments may equally be applied or combined into any of the embodiments discussed above.

In accordance with a further aspect of the invention there is provided an arrangement for a feeding bottle, the feeding bottle comprising a teat component 110, and a container component 120, which together define a bottle volume extending longitudinally between a base end of the container component, and a top end of the teat component. The bottle volume may be understood as having a longitudinal axis extending from said base end to said top end, and a diametric dimension extending orthogonal to the longitudinal axis.

The arrangement comprises an internal element 310 for positioning inside the bottle volume, and a protruding element 320 arranged for extending from the internal element to an outside of the bottle when the bottle is in an assembled state, with the internal element in position, for providing an interconnection between inside and outside of the bottle.

The internal element is for locating at a position inside the bottle, either inside the container or inside the teat component. It is for being fixed in position. The internal element effectively provides an internal anchoring element for holding the interconnect component in place. It may be an integral part of the container or the teat component or may be a separate element arranged to be fixed in position in use.

The bottle volume is defined at least in part by respective internal cavities of the teat component and container component.

The arrangement provides an interconnection between the bottle volume inside the bottle, and the outside of the bottle.

The internal element is preferably configured to be positioned in the bottle such that it is exposed to (i.e. it is arranged to come into contact with) and/or has fluid, mechanical, electrical and/or data communication access to the bottle volume, i.e. the contents of the bottle volume. Preferably, it is exposed to (i.e. it is arranged to come into contact with) and/or has fluid, mechanical, electrical or data communication access to both the teat section of the volume and the container section of the volume. This way interconnection is facilitated between the outside of the bottle and both the teat and container sections of volume.

Here, reference to teat section and container sections of the volume can be understood as follows. A teat section of the volume may extend from the top end of the bottle to the internal element, and a container section may extending from the internal element toward the base of the bottle.

Figure 10:
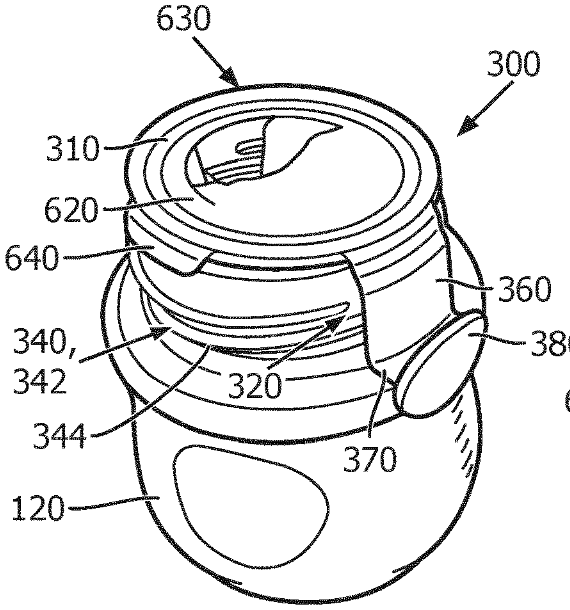
FIGS. 10-12 show different views of one embodiment of a further aspect of the invention, providing an arrangement for a feeding bottle comprising an internal element and a protruding element.
Figure 11:
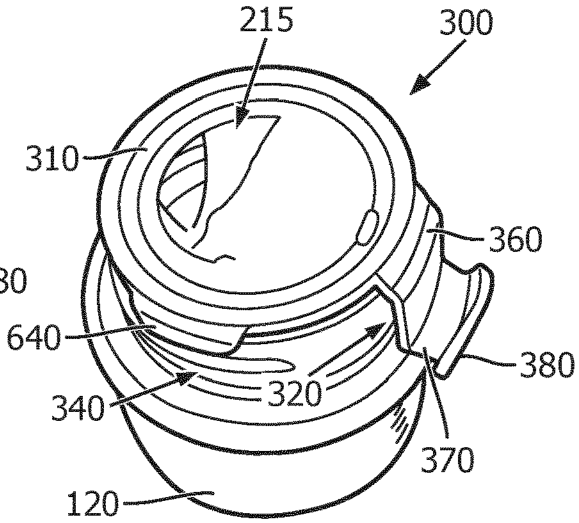
Figure 12:
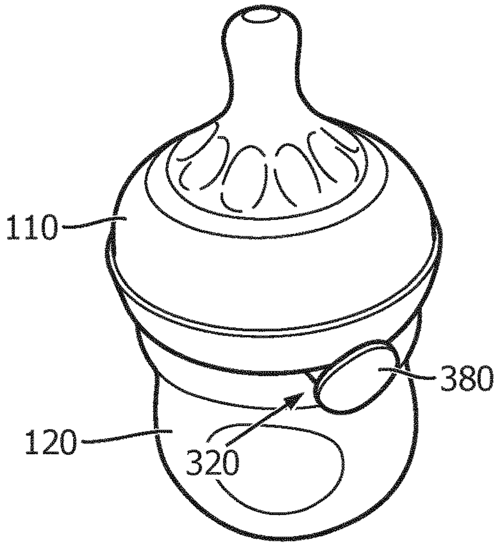

FIGS. 10-12 show different views of one example arrangement 300 according to one or more embodiments. The arrangement comprises an internal element 310 which is substantially disc shaped and a protruding element 320 which outwardly extends from the internal element 310 substantially normal to the plane of the disc shape of the internal element. In this particular example, the internal element is configured to be positioned in use at an interface or junction between the container component 120 and the teat component 110. It may rest atop, or abut, an upper edge or rim of the container component. In this way, when the bottle is assembled, it is arranged exposed to both the teat volume above it and the container volume below it. The arrangement 300 can thus provide an interconnection between the outside of the bottle and both the teat volume 115 and the bottle volume 125.

The feeding bottle 100 comprises a coupling arrangement 340 for coupling the teat component 110 to the container component 120, and wherein the protruding element 320 is arranged to extend to an outside of the bottle via passage through the coupling arrangement. In this example, the coupling is a screw coupling 342.

In particular, the protruding element passes between interfacing parts or surfaces of the coupling arrangement. The interfacing parts are the outer rim surface of the container component and the inner rim surface of the teat component 110.

In this example, the protruding element 320 follows a hook or flap shape for permitting the member to extend over the top of an upper edge of the container component 120, to permit passage of the protruding element to the outside of the container component.

It extends over the top edge and down at least a portion of the outside wall of the container component.

A rounded disc end cap 380 is provided on the external portion of the protruding element 320 which extends substantially parallel with a longitudinal axis of the bottle 100.

A stem part 360 of the protruding element 320 extends over a top edge of the container 120 component, down an outside of the container component wall through a break formed in the screw threads 344 on the container component, before turning and extending outwardly away from the wall (e.g. substantially orthogonally from the stem) to define a short tail section 370. This tail section then is connected to the end disc cap element 380, a plane of the disc cap 380 extending substantially perpendicular to the direction of the tail section 370.

When the bottle is assembled with the teat component 110 attached to the container component 120 as shown in FIG. 12, the disc end cap 380 is shaped and sized so that it protrudes vertically above a lower-most (bottom) edge of the teat component 110, so that it spans a junction or interface line between the teat component 110 and the container component 120.

The protruding element 320 provides a visual indication of an orientation of the internal element 310 of the arrangement 300 which is visible from outside the bottle when the bottle is assembled. It also provides a tactile indicator (by virtue of the disc end cap element 380), meaning that an orientation of the internal element 310 can be sensed just by feeling the position of the end cap around the outer circumference of the bottle. This can be done even in low light.

The protruding element is connected with a fixed position relative to the internal element, meaning that the orientation of the internal element is directly coupled with a position of the protruding element at an outside of the bottle.

In some embodiments, the internal element may carry or be coupled to a further functional element also for location in the bottle volume when assembled, and wherein the protruding element has a fixed position relative to the further functional element, such that an external portion of the protruding element may provide a visual and/or tactile indication of the position (e.g. orientation) of the functional element inside the bottle. By way of example, the further functional element might be any one or more of: a passageway arrangement formed in the internal element (as in examples discussed above) for permitting passage of fluid across the element; a valve, an air-channeling element, a sensor, or even an electrical component such as a heater or mixer.

The internal element is adapted to provide a support function, for holding the protruding element in a fixed position relative to the container component and teat component.

In accordance with one set of embodiments, the internal element may be a partitioning component for dividing an internal volume of the bottle. It may be a partitioning component in accordance with any of the examples outlined above or described below or in accordance with any claim of this application. Thus, the features described herein pertaining to the arrangement comprising internal element and protruding element may be understood to be applicable and fully compatible with any of the example partitioning component embodiments described above.

For example, in the example shown in FIGS. 10-12, the internal element 310 is also a partitioning component for the bottle, comprising a passageway arrangement 215 confined to one diametric side of the internal element 310, offset from a center of the internal element.

Where the internal element takes the form of a partitioning component, advantageously the protruding element 320 may be for providing a visual indication of an orientation of the internal element 310 relative to the bottle. This allows an orientation of the passageway arrangement 315 to be determined from the outside of the bottle, which enables a user to know in which axial orientation the bottle should be held in order to ensure that the passageway arrangement is positioned at a gravitationally lowest point (see discussion above). For example, the protruding element 320 may be arranged diametrically opposite the passageway arrangement, so that a user knows that the external part of the protruding element should be facing vertically upward in order for the passageway arrangement to be pointing downward. An externally exposed part of the protruding element thus provides a visual and tactile indicator of an orientation of the internal element.

Figure 13:
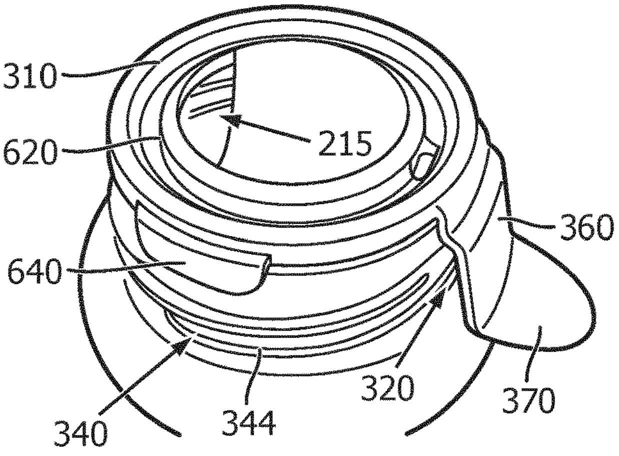
FIG. 13 shows a further embodiment of an arrangement for a feeding bottle.

A further example arrangement in accordance with one or more embodiments is shown in FIG. 13. This example is similar to that of FIGS. 10-12, except that the protruding portion 320 does not comprise a disc end cap which extends substantially parallel to the longitudinal axis of the bottle. Instead, the stem 360 of the protruding portion ends in the tail section 370 which outwardly extends from the stem section 360 in a direction away from the bottle container 120, either substantially perpendicular to the extension direction of the stem section 360 or obliquely with respect to this direction, e.g. obliquely in a direction downward toward a base of the bottle.

Figure 14:
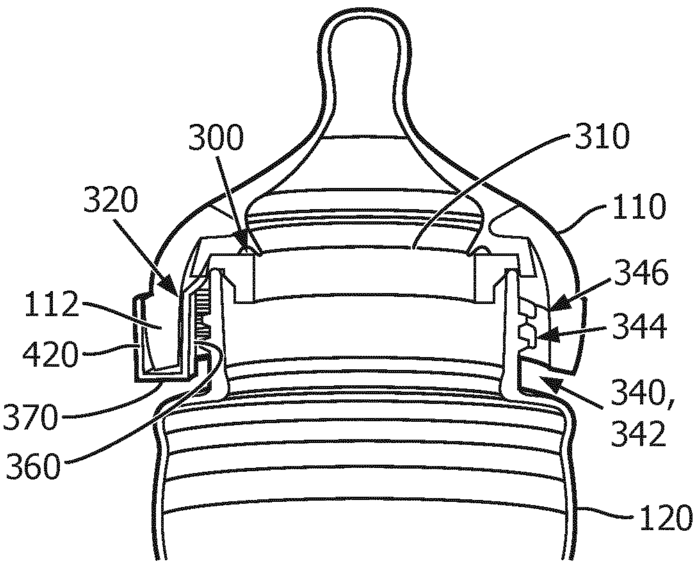
FIGS. 14-17 show different views of a further embodiment of an arrangement for a feeding bottle.
Figure 15:
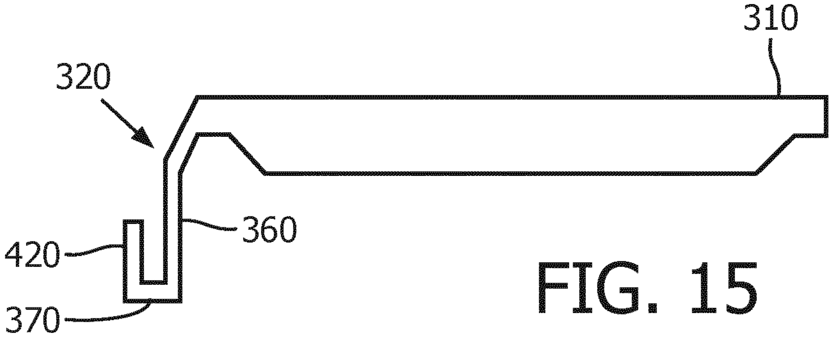
Figure 16:
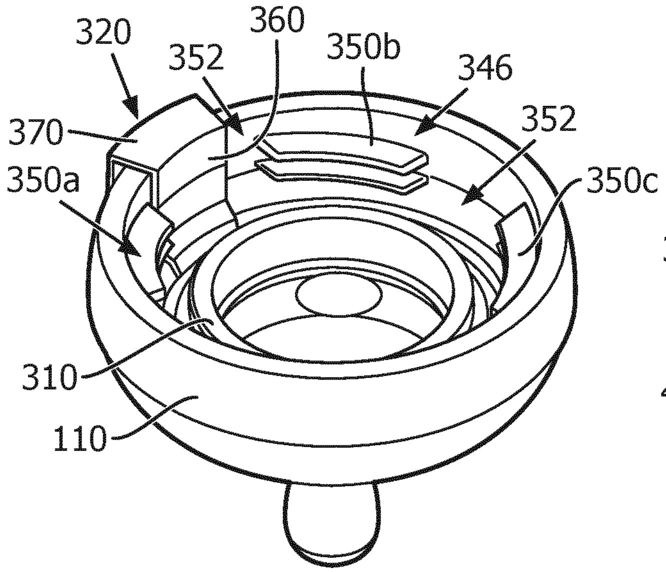

A further example arrangement in accordance with one or more embodiments is shown in FIGS. 14-17. FIGS. 14 and 15 show cross-sectional views of the example arrangement 300. FIG. 16 shows a perspective view of the arrangement fitted in position within a teat component 110 of the bottle.

Figure 17:
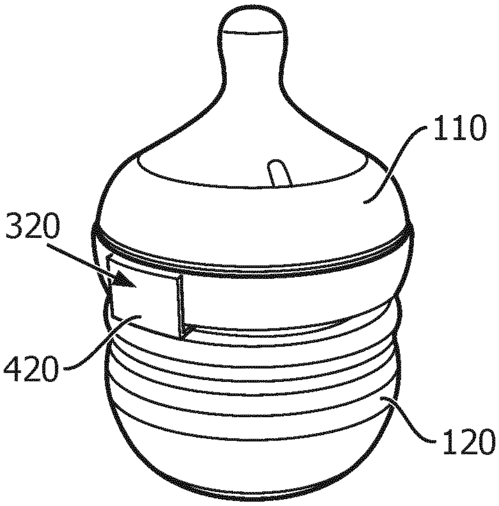

FIG. 17 shows a perspective view of the external section of the protruding element 320 of the arrangement 300, as visible from outside the bottle when the bottle is fully assembled with the arrangement in position.

This example is similar to those of FIGS. 10-13 described above, except for the very end part of the protruding element 320, at the end of the stem 360 and tail 370 section. Instead of ending in a disc end cap 380 as in FIGS. 10-12, the protruding element, at the end of the tail section 370, turns to extend in a direction upward, substantially parallel with the longitudinal axis of the bottle, toward a top end of the bottle (toward the top of the teat component. This upward extending section thereby forms an upstanding tab member 420.

The external part of the protruding element thus defines a U-shape. The U-shape in this example is shaped to bend down and around and back up a lower edge or rim 112 of the container component, so that, when the bottle is fully assembled, the lower edge of the wall of the container component is effectively accommodated within the U-shape defined by the external part of the protruding element 320.

Figure 18:
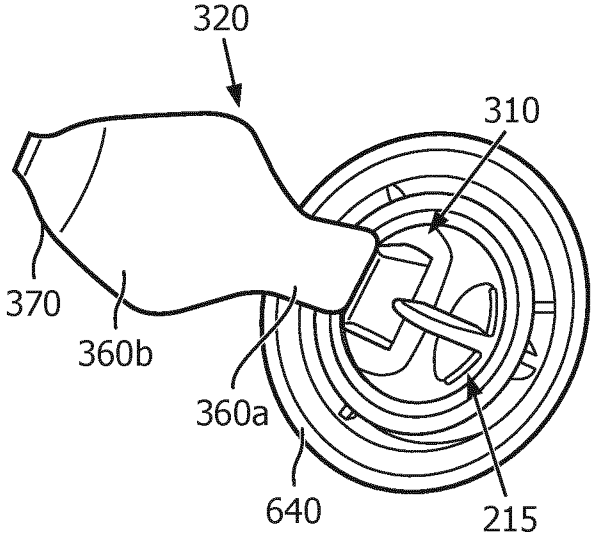
FIGS. 18-19 show a further embodiment of an arrangement for a feeding bottle.
Figure 19:
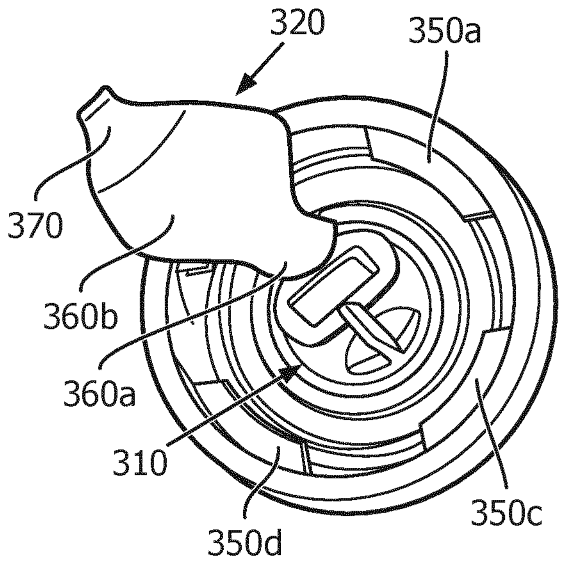

A further example arrangement in accordance with one or more embodiments is shown in FIGS. 18 and 19.

In this example, the internal element 310 is configured to be positioned inside an upper region of the teat component. The protruding element extends downwardly from the plane of the internal element and at a slight oblique angle such that it may pass through interfacing surfaces of the coupling between the teat component 110 and the container component 120 situated below. The protruding element is a flat or laminar element to allow it to fit through the coupling arrangement. The protruding element comprises a stem section 360. The stem section comprises a narrow width portion 360*a* which is arranged to pass though the coupling between the teat component and the container, and a wider width portion 360*b* which is arranged to be exposed outside of the bottle when assembled, and at a level below the screw coupling. The larger width portion provides a visual and tactile indicator element for example.

The protruding element 320 further comprises a tail section 370 which extends obliquely away from the wider width portion 360*b* of the stem.

In accordance with each of the examples of FIGS. 10-19, the internal element comprises a disc element shaped for traversing a cross-section of the bottle volume.

In accordance with each of the examples of FIGS. 10-17, the internal element is configured to be positioned at an interface or junction between the container component and the teat component of the bottle. However, this is not essential, and it may be position at any location along the bottle volume. By way of example, in the example of FIGS. 18 and 19, the internal element 310 is positioned inside the teat component 110 and the protruding element is arranged to extend down from the teat component through a passageway in the screw ring coupling to the outside of the bottle.

In accordance with each of the above examples, the protruding element 320 of the arrangement 300 is configured to extend from the inside to the outside of the bottle via a coupling arrangement 340, 342 of the bottle. In each of the illustrated examples, it extends through a space formed between interfacing parts (faces) of the coupling means. The coupling arrangement in this case is between the container component 120 and the teat component 110, and comprises a screw coupling comprising a pair of complementary threaded areas 344, 346 provided on outside and inside rim surfaces of the container 120 and teat 110 component respectively. The thread coupling is shaped to define a space or channel to accommodate passage of the protruding element 320 between the interfacing rim surfaces, through the coupling arrangement to an outside of the bottle.

In particular examples, at least one of the thread portions 346 may be provided circumferentially discontinuous to thereby define at least one circumferential gap 352 in the threads, the gap arranged to accommodate passage of the protruding element. In preferred embodiments, only one of the thread portions is provided discontinuous and the other is continuous.

This example configuration is shown most clearly in FIG. 16. Here, the thread portion 346 of the teat component 110 is shown. The thread portion is provided on an inner surface of the teat component outer wall, adjacent a lower rim of the teat component. In this example, the thread portion is circumferentially discontinuous around the circumference of the teat component rim. The discontinuous thread portions thus form multiple circumferentially spaced thread sections 350*a*, 350*b*, 350*c*, 350*d* (latter not visible), separated by gaps 352. The protruding element 320 extends through one of the gaps or breaks 352 formed in the threads. It is noted that the complementary thread portion on the container component may be continuous around the circumference of the container rim. In this way, the threads of the teat component are always able to thread couple with the container component threads regardless of the orientational position of the teat component.

One of the thread portions (the one comprised by the container component) is preferably adjacent an upper rim of the container component, and wherein the internal element is configured to be positioned within the bottle volume at a location at or above said upper rim of the container component, and wherein the protruding element is configured to downwardly extend over said thread portion. This thread portion may be continuous. The protruding element 320 is accommodated through a gap formed in the container component threads for example.

Although in each of the examples described above, the provided arrangement 300 takes the form of a partitioning component for the feeding bottle, this is only one example function for the arrangement, and is not essential to the general concept. In general, the arrangement is configured simply to provide an interconnection between the inside and outside of the bottle. This can be useful, as discussed above, for facilitating external visual and/or tactile indication of an orientation of the internal element, by providing that the protruding component 320 provides a physical connection between the internal element 310 and the outside of the bottle.

In particular, the protruding element has a fixed position relative the internal element 301, which means that changes in the orientation of the internal element (inside the bottle) as the bottle is rotated are directly coupled to changes in a position of the protruding element at the outside of the bottle (e.g. the indicator element). For example the angular position of the protruding element around the bottle changes.

In some embodiments, the internal element may carry or be coupled to a further functional element also for location in the bottle volume when assembled, and wherein the protruding element has a fixed position relative to the further functional element, such that an external portion of the protruding element may provide a visual and/or tactile indication of the position (e.g. orientation) of the functional element inside the bottle. By way of example, the further functional element might be any one or more of: a passageway arrangement formed in the internal element (as in examples discussed above) for permitting passage of fluid across the element; a valve, an air-channeling element, a sensor, or even an electrical component such as a heater or mixer.

Additionally or alternatively, the protruding element may be configured to provide an electrical and/or data connection between the inside and the outside of the bottle.

In particular, in some embodiments, the protruding element 320 may incorporate an electrically conducting element for providing an electrical interconnection between the inside and outside of the bottle. An electrical connection may be useful for supplying a power to an internal electrical component such an internal heater, and internal mixing mechanism, an internal light or any other electrical component.

Additionally or alternatively, in some embodiments, the protruding element 320 may comprise a data-carrying line for providing a data interconnection between an inside and outside of the bottle. A data connection may be useful for receiving data from one or more sensors such as a temperature sensor for instance.

Additionally or alternatively, in some embodiments, the protruding element may incorporate a fluid passageway (e.g. air and/or liquid) from the inside the bottle to outside the bottle. It may for instance include an integrated fluid conduit for facilitating this. This could be useful for example for diverting air out of a certain section of the bottle volume, or providing an overspill outlet for instance.

The bottle may be provided in combination with the arrangement 300 with internal element and protruding element 320, or the arrangement 300 may be provided by itself for fitting into a bottle.

Examples will now be described in accordance with a further aspect of the invention. Features of these embodiments may equally be applied or combined into any of the embodiments discussed above In accordance with a further aspect of the invention there is provided an internal element 310 for a feeding bottle, the feeding bottle comprising a teat component 110, and a container component 120, which together define a bottle volume extending longitudinally between a base end of the container component, and a top end of the teat component, the bottle volume having a longitudinal axis extending from said base end to said top end, the internal element 310 comprising a disc element 620 configured to be positioned within the bottle volume extending transverse the longitudinal axis, and further comprising one or more tab elements 640 protruding from an outer periphery 630 of the disc element for being received between interfacing parts of a coupling arrangement 340, 342 of the bottle.

Figure 20:
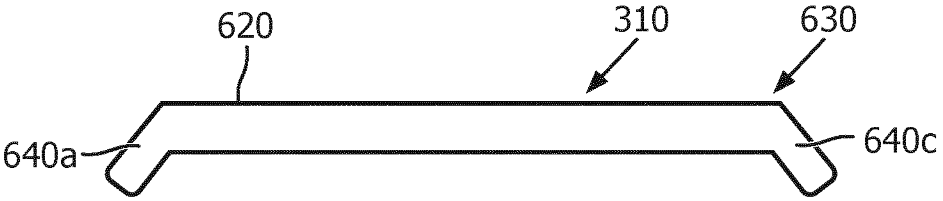
FIGS. 20-21 show views of one embodiment in accordance with a further aspect of the invention, providing an internal element for a feeding bottle, having tab elements.
Figure 21:
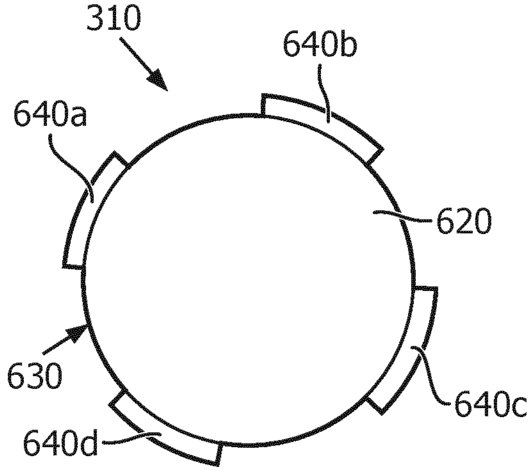

An example internal element 310 in accordance with one or more embodiments is shown schematically in FIG. 20 and FIG. 21, in cross-section and plan views respectively. The internal element 310 comprises a disc shaped portion (disc element) 620 and further comprises a set of one or more tab elements 640. In the example of FIG. 20 and FIG. 21, a plurality of tab elements 640*a* -640*d* is provided. In the particular example illustrated, four tab elements are provided. However, any other number of tab elements may be provided. Preferably the one or more tab elements are arranged in an annularly symmetric pattern or configuration around the perimeter of the disk element 620.

The one or more tab elements 640 are configured for being received between interfacing parts of a coupling arrangement of the bottle, for example a coupling arrangement between the container component and the teat component. The function of this is to provide support to the internal element against downward forces imposed by the coupling between the components of the bottle which might otherwise force the internal element downward, e.g. buckling, deforming or displacing it. The tab elements being trapped in the coupling arrangement provides a resistance against such forces.

Figure 22:
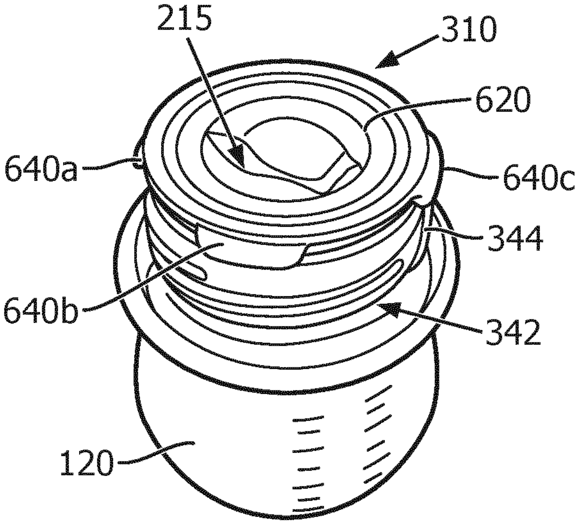
FIG. 22 shows a further embodiment of an internal element for a feeding bottle.

In the particular example shown in FIG. 22, the tab elements 340 are for being received between interfacing parts of a screw coupling arrangement 342 which couples the teat component to the container component.

The tab components 640 are configured to be received between threads of the screw coupling.

Although in the example shown in FIG. 21, the disc element portion 620 of the internal element 310 takes the form of a continuous planar disc, in other embodiments, it may take the form of an annular disk (i.e. defining a ring shape). The particular shape may depend upon the function for which the internal element is used 310.

There are different options for the configuration and function of the internal element 310.

In some examples, it may be a partitioning component for fluidly dividing an internal volume of the bottle and mediating flow of fluid between them.

For example, it may be a partitioning component for fluidly dividing the bottle volume into two longitudinal sections, a teat section 115 extending from the top end of the bottle to the partitioning component, and a container section 125 extending from the partitioning component toward the base of the bottle. It may for example be a partitioning component in accordance with any of the examples described above or below, or in accordance with any claim of this application. Thus any of the features described herein in relation to the internal element according to this aspect of the invention may be applied or incorporated into any of the example partitioning component embodiments outlined above.

By way of example, FIG. 22 shows one example internal element 310 in accordance with one or more embodiments of the present aspect which takes the form of a partitioning component, and comprises a fluid passageway arrangement 215 comprising one or more openings 220 for permitting flow of fluid across the partitioning component.

However, the internal element 310 can take different forms for performing different functions.

Figure 23:
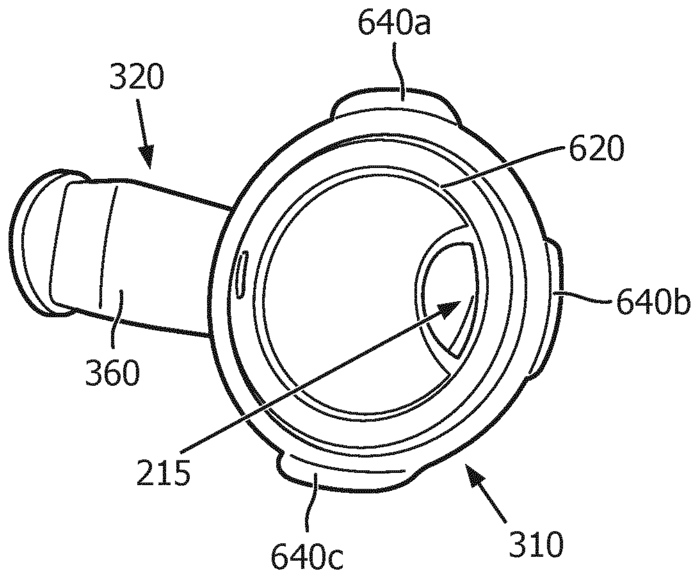
FIG. 23 shows a further embodiment of an internal element for a feeding bottle.

By way of example, FIG. 23 shows an example internal element 310 in accordance with one or more embodiments of this aspect which comprises a protruding element 320 arranged for extending from the internal element 310 to an outside of the bottle when the bottle is in an assembled state, for providing an interconnection between the inside and outside of the bottle. For example, the internal element may thus take the form of an internal element of an arrangement 300 in accordance with any of the example embodiments discussed above in relation to FIGS. 10-19, or as set out in any claim of this application. Thus, features of the presently described internal element 310 may be applied or incorporated into any of the example arrangement 300 embodiments discussed above.

For example, tab elements 640 in accordance with embodiments of the present aspect are shown as included on the internal element 310 of the example of FIG. 10-12 (see FIGS. 10 and 11), and also on the internal element of FIG. 13. However, the tab elements are not essential in those embodiments, and may be omitted in variations.

Returning to the example of FIG. 23, the internal element 310 in this example comprises the protruding element 320 and further comprises a set of tab elements 640*a* -*c* arranged protruding from the outer periphery of the disc element part 620 of the internal element 310. Three tab elements are provided in this example but more or fewer may be provided in variations on this example.

In the example of FIG. 23, the disc part 620 of the internal element 310 incorporates a fluid passageway arrangement 215 for permitting passage of fluid across the element. The internal element 310 in this example may thus perform the function of a partitioning component as discussed above. However, in other examples, an internal element can be provided with the tabs 640 and protruding element 320 but without being for the function of providing a partitioning component. For example, the disc element 620 part of the internal element could be annular (ring shaped) in form, so that fluid can effectively flow freely across the element, so it does not fluidly partition the volume.

The disc part 620 of the internal element 310 defines a plane. The tab elements 640 in this example extend obliquely with respect to this plane. In particular, they extend in a direction obliquely downward, toward a base of the container component when the internal element is in position. This is visible for example in FIG. 22 and FIG. 23, and also in the schematic cross-sectional view of FIG. 20.

This oblique shape can provide greater stability to the internal element since it effectively provides a hook shape for the element to hook over a top edge of the container component, or to hook inside a coupling arrangement within which it is received.

In accordance with one or more embodiments, the disc 620 of the internal element 310 may define a plane, and wherein the one or more tab elements are resiliently bendable in a direction oblique to the plane.

The one or more tab elements 640 may be formed of a resilient or elastic material in some examples, for example an elastomeric material. In some examples, an outer rim portion of the internal element 310 may be formed of a resilient or elastic material, for example an elastomeric material.

In accordance with the example of FIG. 22 and FIG. 23, the internal element 310 is configured to be positioned at an interface or junction between the teat component 110 and the container component 120 of the bottle. The internal element is illustrated placed in this position in FIG. 22 for example.

Figure 24:
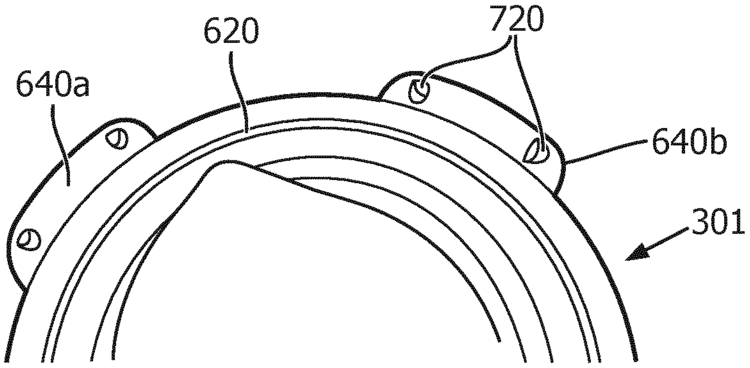
FIG. 24 shows an example internal element comprising tab elements having optional friction protrusions on one surface.

In accordance with one or more advantageous examples, the one or more tab elements 640 may each comprise one or more protrusions or bosses formed on at least one face of the tab element. This is illustrated in FIG. 24 for example. FIG. 24 shows an underside surface of the internal element 301 illustrated in FIG. 13. Only half of the internal element 301 is shown. In this example, each of the tab elements 640 comprises a plurality of bosses or balls 720 which protrude from an underside face of the tab elements. These protrusions provide additional friction for increasing a friction between the tab elements and the coupling arrangement within which they are received. This helps with even more securely retaining the internal element 301 in position, against movement, once the bottle is assembled with the tab elements 640 received within the coupling arrangement 340, 342.

In particular examples, the disc part 620 of the internal element may define a plane, and the tab elements 640 may protrude obliquely with respect to this plane, for example as illustrated in the example of FIG. 24 (and FIG. 23). Thus in this case, the tab elements may effectively hook over a top rim edge of the container component. By providing the optional protrusions or bosses 720 on the underside of the tab elements 640, friction is increased and the tab elements may provide at least partial clamping of the internal element to the container component. This prevents the internal element being dragged along around the screw ring coupling 342 when the teat component is screwed onto the container component. Hence they provide a frictional resistance against axial rotation of the internal element.

As mentioned above, in the particular example shown in the Figures, the tab elements 640 are for being received between interfacing parts of a screw coupling arrangement 342 which couples the teat component to the container component.

The screw coupling 342 comprises complementary thread portions 344, 346 provided on outer and/or inner surfaces of the teat component and container component respectively, one of the thread portions being located adjacent an upper edge of the container component 120. The thread portions may be thread rings, or portions of a thread ring.

The thread portions 344 extend discontinuously around the perimeter of at least one of the teat component 110 and container component 120, to form multiple circumferentially spaced thread sections 350, and wherein the internal element 310 comprises a respective tab element 640 for each of the thread sections of the coupling arrangement.

This example configuration of threads is shown for example FIG. 16. Here, the thread portion 346 of the teat component 110 is shown. The thread portion is provided on an inner surface of the teat component outer wall, adjacent a lower rim of the teat component. In this example, the thread portion is circumferentially discontinuous around the circumference of the teat component rim. The discontinuous thread portions thus form multiple circumferentially spaced thread sections 350. This arrangement is also visible in FIG. 19.

The thread portion 344 of the container component 120 may be continuous, so that the discontinuous thread portion 346 of the teat component 110 may couple to it regardless of orientational position.

Although in each of the examples discussed above, a plurality of tab elements are provided, in other example just one tab element may be provided. By way of one illustration, the example arrangement of FIG. 18 (discussed above) provides one example of an internal element 310 which comprises a single tab element 420. The single tab element extends annularly all the way around the circumference of the disc element portion of the internal element 310. It thus provides a circumferentially symmetric tab arrangement. The internal element of FIG. 18 is part of an arrangement 300 comprising the internal element and a protruding element 320 and has been discussed above.

The single tab 640 element may be formed of a flexible or elastomeric material to permit it to flex to be received within the coupling 340, for example between threads of a screw coupling 342.

In examples in which a plurality of tab elements 640 is provided, preferably the tabs are positioned in diametrically opposing pairs around the rim of the disc element. This provides symmetrical support for the disc element against buckling.

Variations to the disclosed embodiments can be understood and effected by those skilled in the art in practicing the claimed invention, from a study of the drawings, the disclosure and the appended claims. In the claims, the word “comprising” does not exclude other elements or steps, and the indefinite article “a” or “an” does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A feeding bottle, comprising: a teat component, and a container component, which together define a bottle volume extending longitudinally between a base end of the container component, and a top end of the teat component, the bottle volume having a longitudinal axis extending from the base end to the top end, and a diametric dimension extending orthogonal to the longitudinal axis; and a partitioning component for fluidly dividing the bottle volume into two longitudinal sections, wherein the two longitudinal sections comprise a teat section extending from the top end of the feeding bottle to the partitioning component and a container section extending from the partitioning component toward the base end of the feeding bottle, wherein the partitioning component comprises a fluid passageway arrangement comprising a plurality of openings for permitting flow of fluid across the partitioning component, wherein the fluid passageway arrangement is arranged such that when the partitioning component is in place in the feeding bottle for dividing the bottle volume, the fluid passageway arrangement is located on one diametric side of the bottle volume, or the teat section of the bottle volume, and wherein a remainder of the partitioning component provides no fluid communication between the container component and the teat component, wherein the fluid passageway arrangement is configured to permit simultaneous flow of both liquid and air in different respective directions across the partitioning component, and wherein the fluid passageway arrangement is arranged such that, when the partitioning component is in place in the feeding bottle for dividing the bottle volume, the plurality of openings of the fluid passageway arrangement extend, either alone or in combination, to multiple heights along a direction of the longitudinal axis of the bottle volume, and wherein the partitioning component includes at least two substantially parallel surfaces at different heights including a first surface at a lowermost height and a second surface at an uppermost height, and at least one first opening is provided in the first surface and at least one second opening is provided in the second surface, and the at least one first opening and the at least one second opening have approximately the same size and wherein the partitioning component has a main component and a single extruded component a first boundary of one of the plurality of openings is arranged to be at a first height along the direction of the longitudinal axis in the main component, and a second boundary of at least a second one of the plurality of openings is arranged to be at a second, greater height in the single extruded component.

2. The feeding bottle as claimed in claim 1, wherein the partitioning component has an outer boundary, and wherein the multiple heights are multiple heights along a dimension normal to a plane defined by or containing the outer boundary of the partitioning component.

3. The feeding bottle as claimed in claim 1, wherein the fluid passageway arrangement is located offset from a center of the partitioning component, on one diametric side of the partitioning component.

4. The feeding bottle as claimed in claim 1, wherein the fluid passageway arrangement is sized and shaped to provide two simultaneous fluid flow-paths, separated spatially, to permit the flow of both liquid and air.

5. The feeding bottle as claimed in claim 1, wherein a shortest distance from the fluid passageway arrangement to an outer boundary of the partitioning component is from a point of the fluid passageway arrangement closest to the outer boundary of the partitioning component and is less than one quarter of a diameter of the partitioning component.

6. The feeding bottle as claimed in claim 1, wherein the fluid passageway arrangement is located closer to an outer boundary of the partitioning component than to a center of the component.

7. The feeding bottle as claimed in claim 1, wherein the fluid passageway arrangement consists of a single elongate opening.

8. The feeding bottle as claimed in claim 7, wherein an elongate length of the single elongate opening extends transverse a radial axis of the partitioning component.

9. The feeding bottle as claimed in claim 1, wherein at least one of the plurality of openings is formed by a cut-out portion, cut from an edge of the partitioning component.

10. The feeding bottle as claimed in claim 1, wherein a surface of the partitioning component is arranged to slope or curve downward or upward away from all sides of at least one of the plurality of openings, for guiding fluid into the at least one of the plurality of openings.

11. The feeding bottle as claimed in claim 1, wherein:

the partitioning component is formed integrally with either the teat component or the container component; or the feeding bottle includes attachment means by which the partitioning component is retained in position in the feeding bottle.

12. A partitioning component for a feeding bottle, the feeding bottle comprising a teat component, and a container component, which together define a bottle volume extending longitudinally between a base end of the container component, and a top end of the teat component, the bottle volume having a longitudinal axis extending from the base end to the top end, and a diametric dimension extending orthogonal to the longitudinal axis, the partitioning component for fluidly dividing the bottle volume into two longitudinal sections, a teat section extending from the top end of the feeding bottle to the partitioning component, and a container section extending from the partitioning component toward the base end of the feeding bottle, and the partitioning component comprising a fluid passageway arrangement comprising a plurality of openings at different heights along the longitudinal axis for permitting flow of fluid across the partitioning component; wherein the fluid passageway arrangement is arranged such that when the partitioning component is in place in the feeding bottle for dividing the bottle volume, the fluid passageway arrangement is located on one diametric side of the bottle volume, or the teat section of the bottle volume, and wherein a remainder of the partitioning component provides no fluid communication between the container component and the teat component, the fluid passageway arrangement configured to permit simultaneous flow of both liquid and air in different respective directions across the partitioning component, wherein the fluid passageway arrangement includes at least one opening having a diameter of at least 10 mm and wherein the partitioning component includes at least two substantially parallel surfaces at different heights including a first surface at a lowermost height and a second surface at an uppermost height, and at least one first opening is provided in the first surface and at least one second opening is provided in the second surface, and the at least one first opening and the at least one second opening have approximately the same size and wherein the partitioning component has a main component and a single extruded component a first boundary of one of the plurality of openings is arranged to be at a first height along the direction of the longitudinal axis in the main component, and a second boundary of at least a second one of the plurality of openings is arranged to be at a second, greater height in the single extruded component.

13. A partitioning component for a feeding bottle, the feeding bottle comprising a teat component, and a container component, which together define a bottle volume extending longitudinally between a base end of the container component, and a top end of the teat component, the bottle volume having a longitudinal axis extending from the base end to the top end, and a diametric dimension extending orthogonal to the longitudinal axis, wherein the partitioning component for fluidly divides the bottle volume into two longitudinal sections, the two longitudinal sections comprising a teat section extending from the top end of the feeding bottle to the partitioning component and a container section extending from the partitioning component toward the base end of the feeding bottle, wherein the partitioning component comprises a fluid passageway arrangement comprising a plurality of openings for permitting flow of fluid across the partitioning component; wherein the fluid passageway arrangement is arranged such that when the partitioning component is in place in the feeding bottle for dividing the bottle volume, the fluid passageway arrangement is located on one diametric side of the bottle volume, or the teat section of the bottle volume, and wherein a remainder of the partitioning component provides no fluid communication between the container component and the teat component, the fluid passageway arrangement configured to permit simultaneous flow of both liquid and air in different respective directions across the partitioning component, and wherein the partitioning component has an outer boundary, and wherein the fluid passageway arrangement is arranged such that the plurality of openings of the fluid passageway arrangement extend, either alone or in combination, to multiple heights along a dimension normal to a plane defined by or containing the outer boundary of the partitioning component and wherein the partitioning component includes at least two substantially parallel surfaces at different heights including a first surface at a lowermost height and a second surface at an uppermost height, and at least one first opening is provided in the first surface and at least one second opening is provided in the second surface, and the at least one first opening and the at least one second opening have approximately the same size, and wherein the partitioning component has a main component and a single extruded component, and wherein a first boundary of one of the plurality of openings is arranged to be at a first height along a direction of the longitudinal axis in the main component, and a second boundary of at least a second one of the plurality of openings is arranged to be at a second, greater height in the single extruded component.

14. The feeding bottle as claimed in claim 5, wherein the shortest distance from the fluid passageway arrangement to the outer boundary of the partitioning component is less than one fifth of the diameter.

15. The feeding bottle as claimed in claim 14, wherein the shortest distance from the fluid passageway arrangement to the outer boundary of the partitioning component is less than one sixth of the diameter.

* * * * *